United States Patent
Lee et al.

(10) Patent No.: US 11,765,229 B2
(45) Date of Patent: *Sep. 19, 2023

(54) METHOD OF OPERATING NETWORK-BASED STORAGE DEVICE, METHOD OF OPERATING STORAGE SYSTEM USING THE SAME AND STORAGE MODULE PERFORMING THE SAME

(71) Applicant: SAMSUNG ELECTRONICS CO., LTD., Suwon-si (KR)

(72) Inventors: Sukkyu Lee, Seoul (KR); Hanmin Cho, Seoul (KR); Youngjin Cho, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/973,205

(22) Filed: Oct. 25, 2022

(65) Prior Publication Data

US 2023/0043583 A1 Feb. 9, 2023

Related U.S. Application Data

(63) Continuation of application No. 17/478,480, filed on Sep. 17, 2021, now Pat. No. 11,516,292, which is a
(Continued)

(30) Foreign Application Priority Data

Jan. 3, 2020 (KR) .................. 10-2020-0000589

(51) Int. Cl.
G06F 15/16 (2006.01)
H04L 67/1097 (2022.01)
(Continued)

(52) U.S. Cl.
CPC ........ *H04L 67/1097* (2013.01); *H04L 49/351* (2013.01); *H04L 67/1044* (2013.01); *H04L 67/1074* (2013.01)

(58) Field of Classification Search
CPC ............. H04L 67/1097; H04L 67/1044; H04L 67/1074; H04L 49/351; H04L 49/356
(Continued)

(56) References Cited

U.S. PATENT DOCUMENTS 7,478,120 B1 * 1/2009 Zhang ................. H04L 67/1089
709/251
7,849,303 B2 12/2010 Miller
(Continued)

FOREIGN PATENT DOCUMENTS

CN 107771338 A * 3/2018 ........... G06Q 20/227
JP 20030296154 10/2003

OTHER PUBLICATIONS

European Search Report dated Apr. 26, 2021 From European Patent Office Cited in European Patent Application No. 20210595.3.

*Primary Examiner* — Ruolei Zong
(74) *Attorney, Agent, or Firm* — Fish & Richardson P.C.

(57) ABSTRACT

In a method of operating network-based storage devices, a first storage device having a first local key among a plurality of storage devices is set as a first main storage device. The storage devices are connected to each other through a network. A volume of at least a part of the plurality of storage devices is set and managed by the first storage device based on a first control signal received from an external host device. A second local key is received by the first storage device from a second storage device having the second local key among the plurality of storage devices. The first local key and the second local key are transmitted by the first storage device to the external host device.

20 Claims, 36 Drawing Sheets

Related U.S. Application Data continuation of application No. 17/003,265, filed on Aug. 26, 2020, now Pat. No. 11,146,636.

(51) Int. Cl.
    *H04L 49/351*     (2022.01)
    *H04L 67/104*     (2022.01)
    *H04L 67/1074*    (2022.01)

(58) Field of Classification Search
    USPC .......................................................... 709/213
    See application file for complete search history.

(56) References Cited

U.S. PATENT DOCUMENTS

| | | |
|---|---|---|
| 8,166,264 B2 | 4/2012 | Otani et al. |
| 8,612,561 B2 | 12/2013 | Ni |
| 10,275,180 B2 | 4/2019 | Ballapuram et al. |
| 10,394,604 B2 | 8/2019 | Olarig et al. |
| 11,146,636 B2 | 10/2021 | Lee et al. |
| 2012/0254456 A1 | 10/2012 | Visharam et al. |
| 2013/0055371 A1 | 2/2013 | Kumano et al. |
| 2013/0159622 A1 | 6/2013 | Cohen |
| 2017/0099348 A1 | 4/2017 | Birendoim et al. |
| 2017/0337140 A1* | 11/2017 | Ragupathi ............... G06F 21/78 |
| 2018/0004954 A1* | 1/2018 | Liguori ................ H04L 9/3239 |
| 2018/0052624 A1* | 2/2018 | Marripudi ............. G06F 11/108 |
| 2018/0321876 A1 | 11/2018 | Ballapuram et al. |
| 2019/0102092 A1 | 4/2019 | Tsao et al. |
| 2020/0076600 A1* | 3/2020 | Driever ............... H04L 63/0869 |
| 2020/0097659 A1* | 3/2020 | Olarig ................... H04L 63/108 |
| 2020/0320226 A1* | 10/2020 | Chitrak Gupta .... G06F 21/6218 |

\* cited by examiner

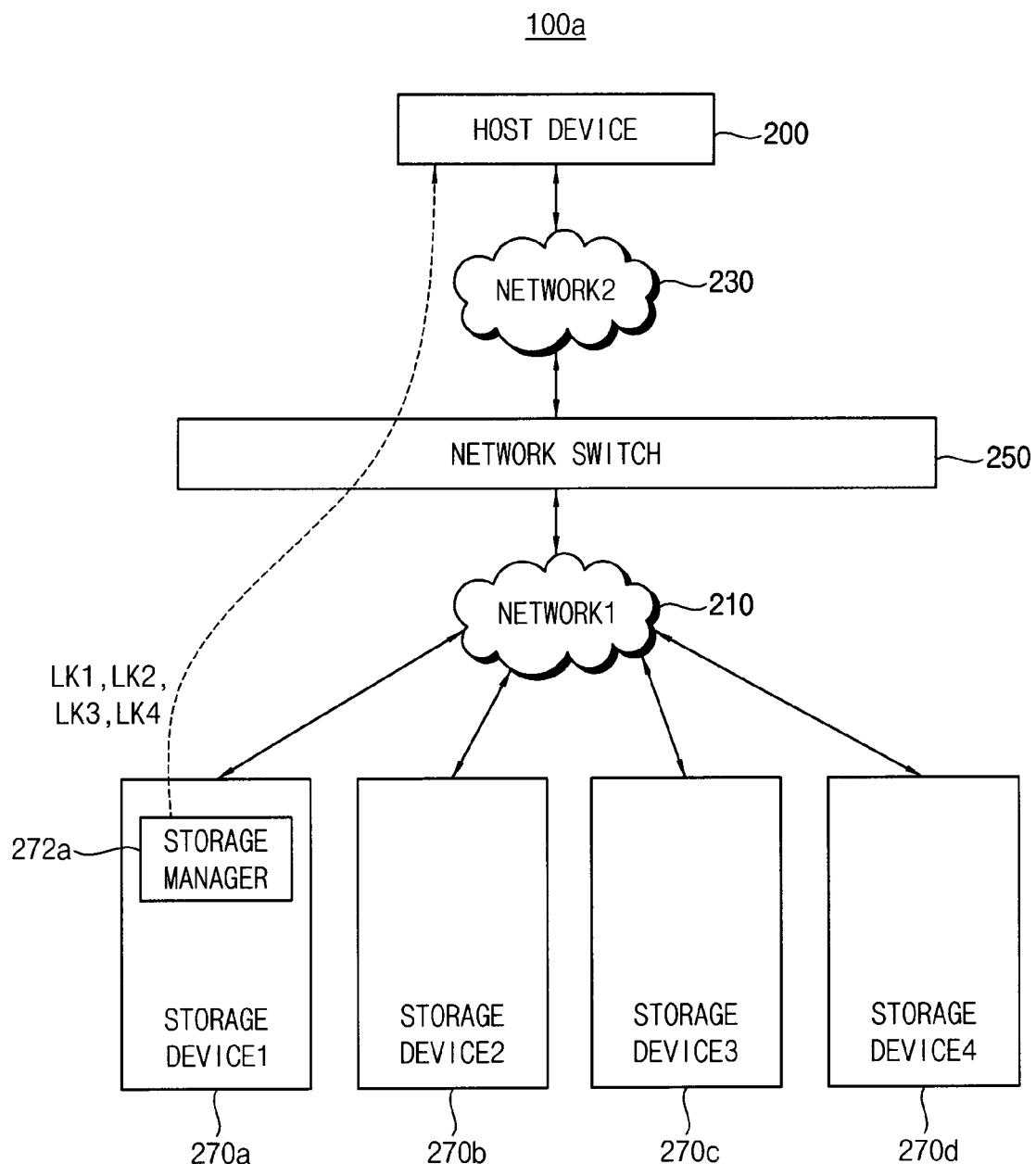

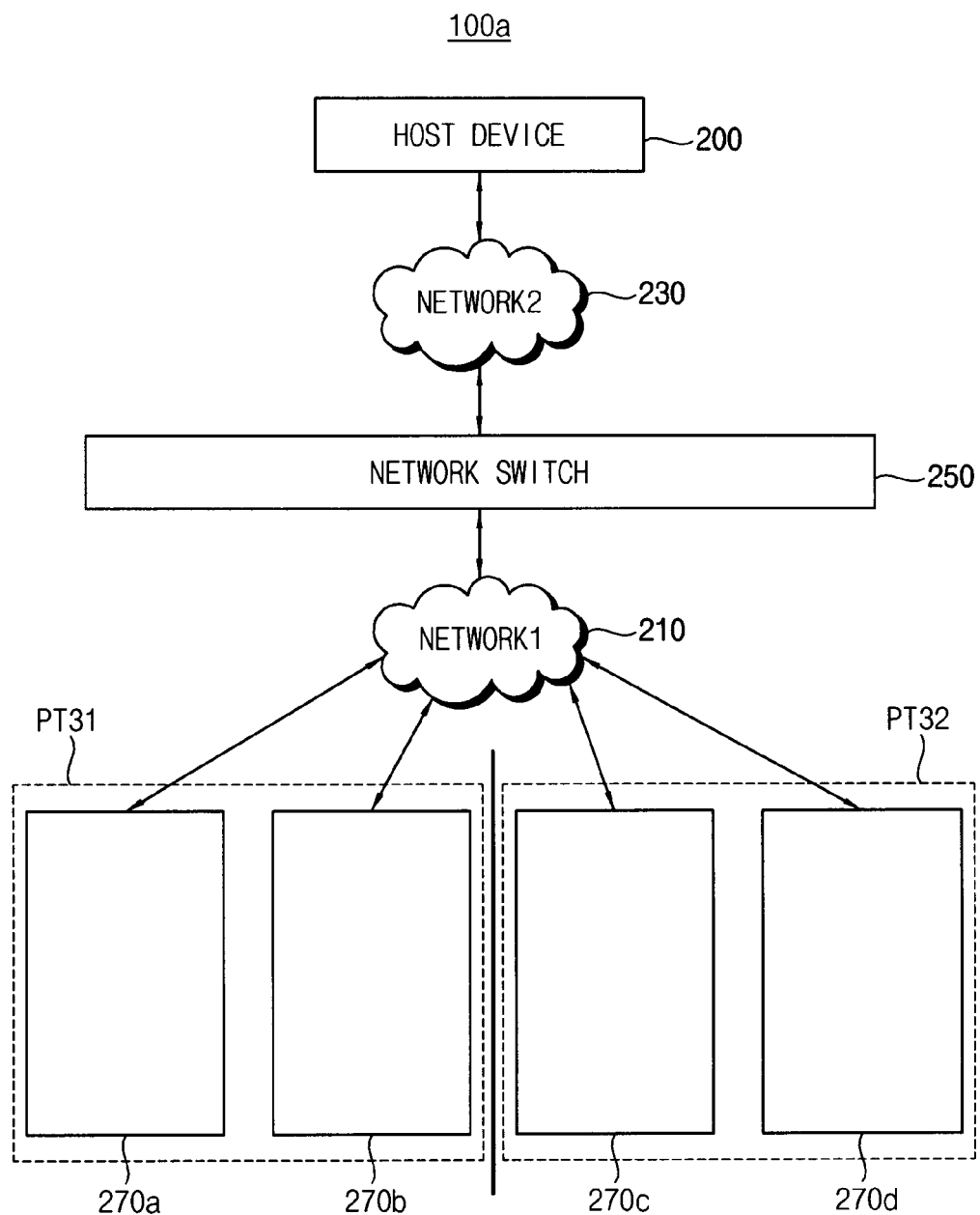

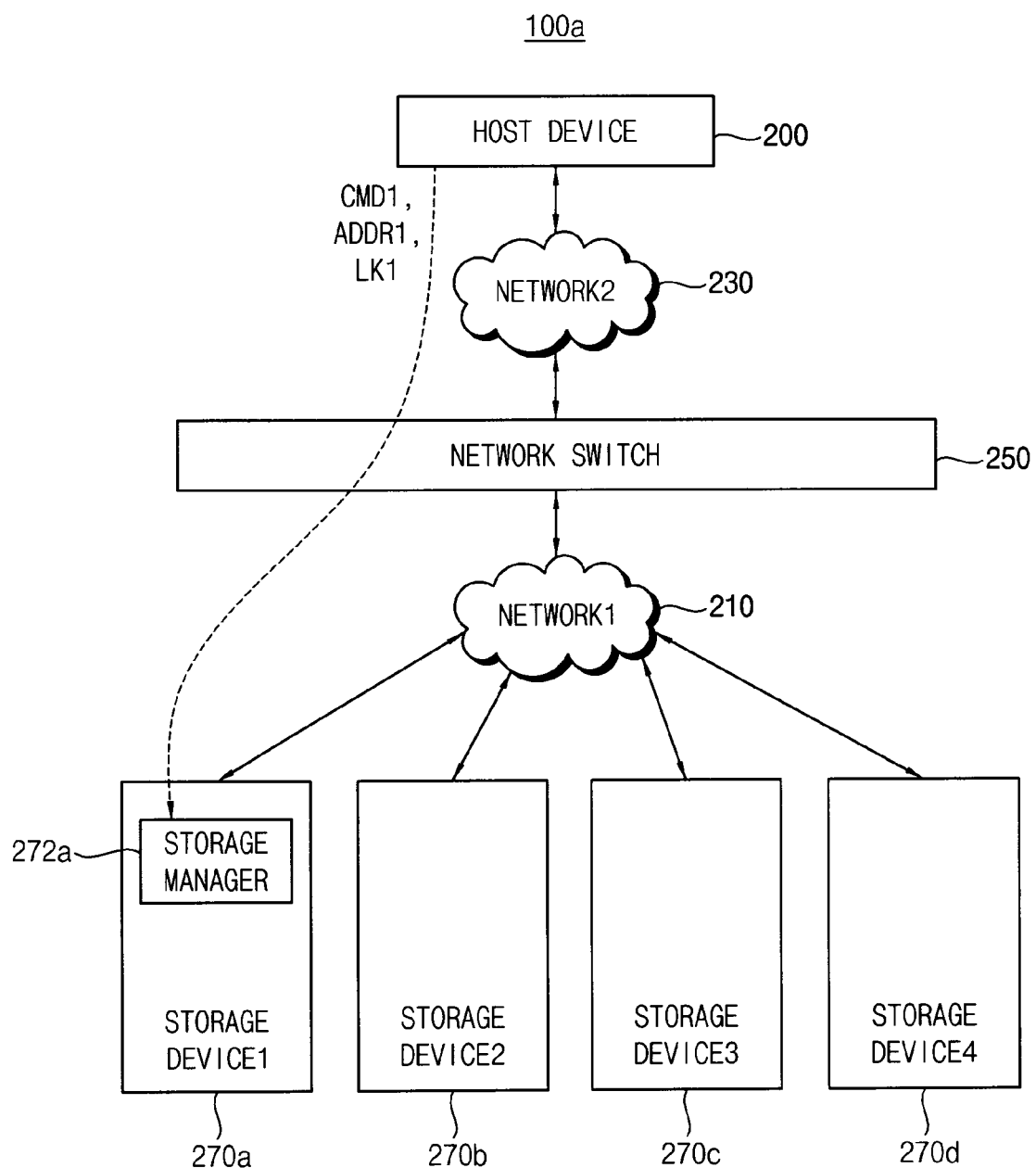

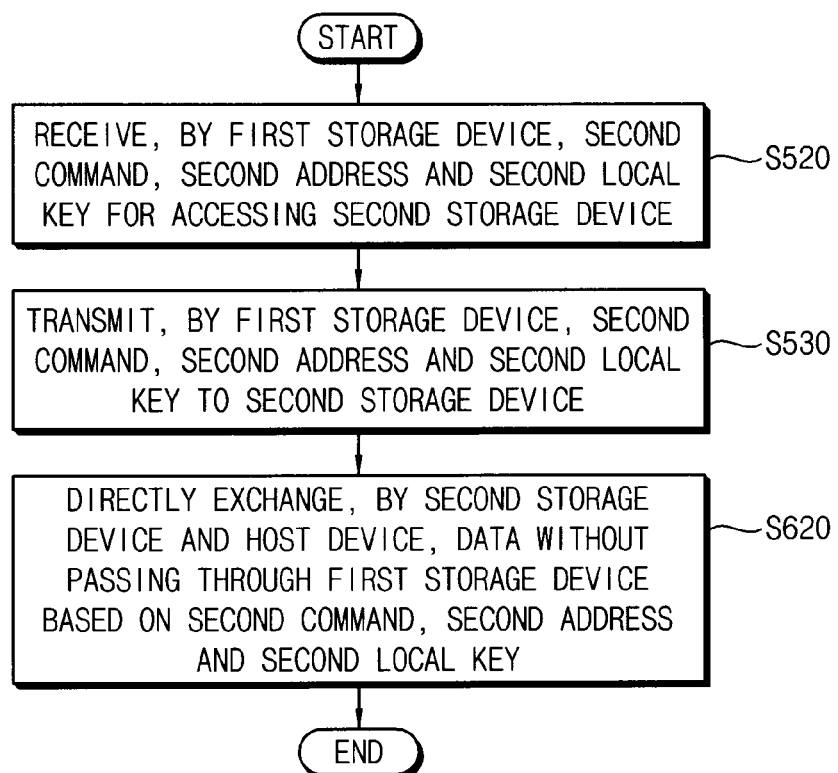

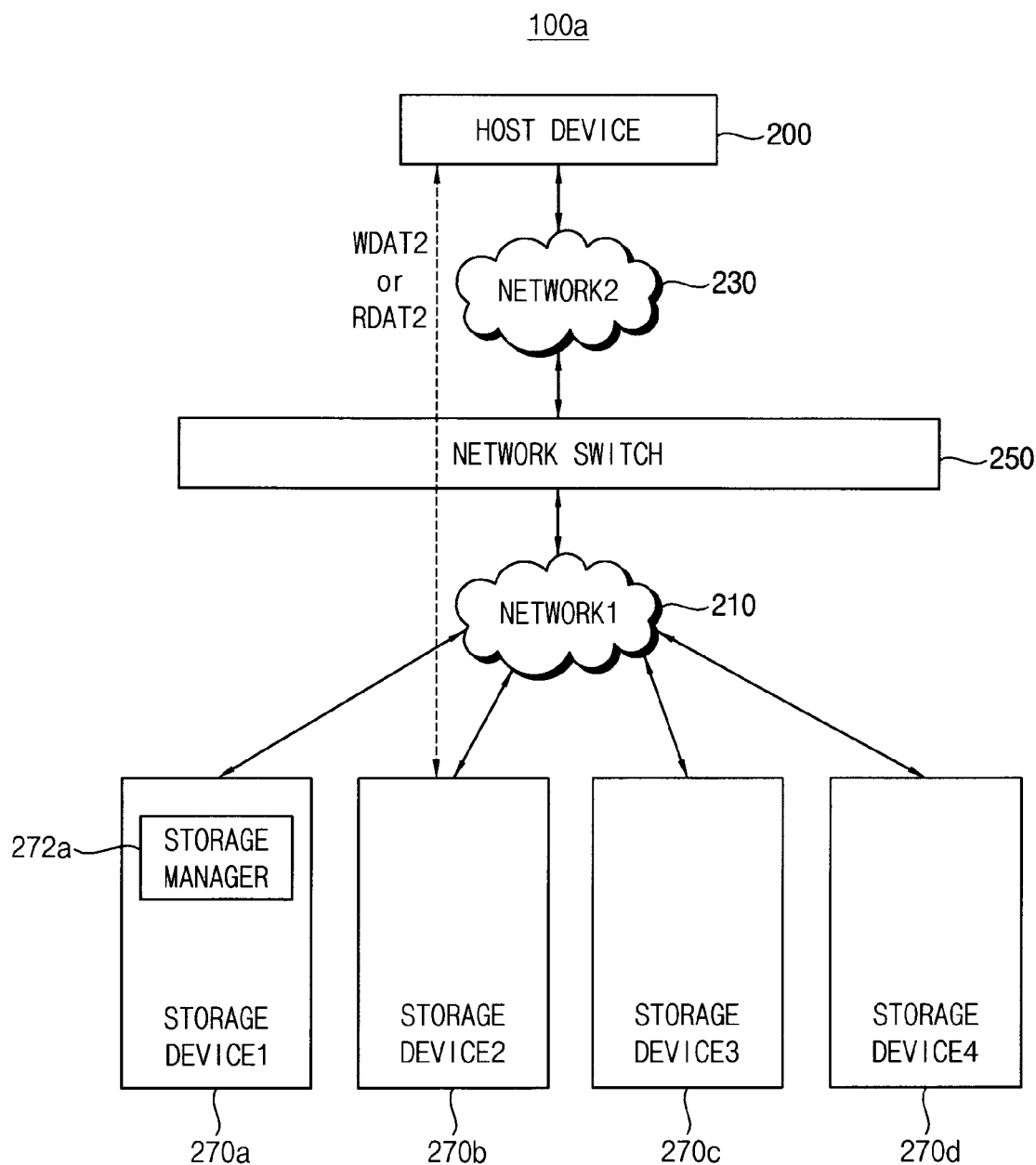

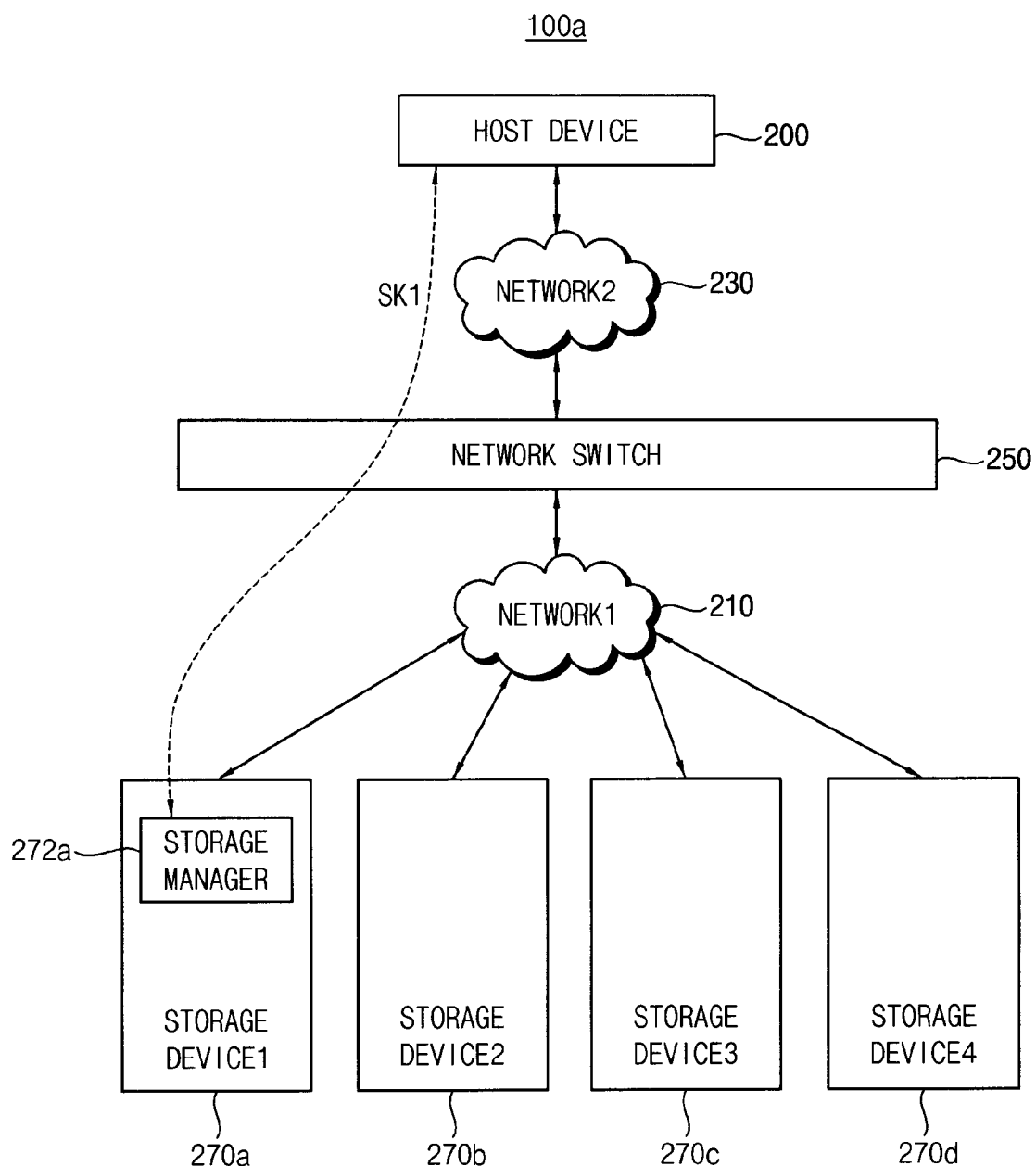

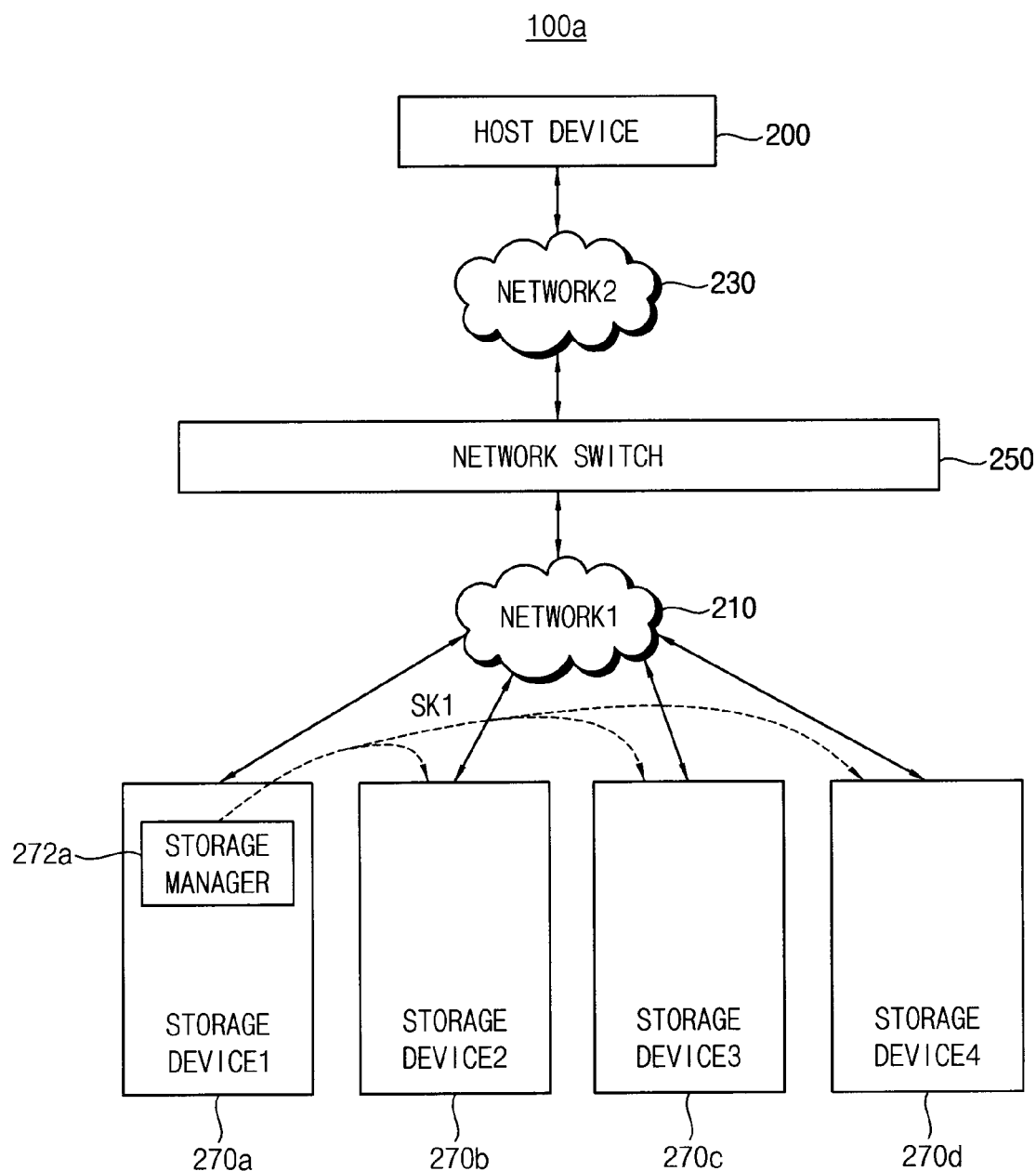

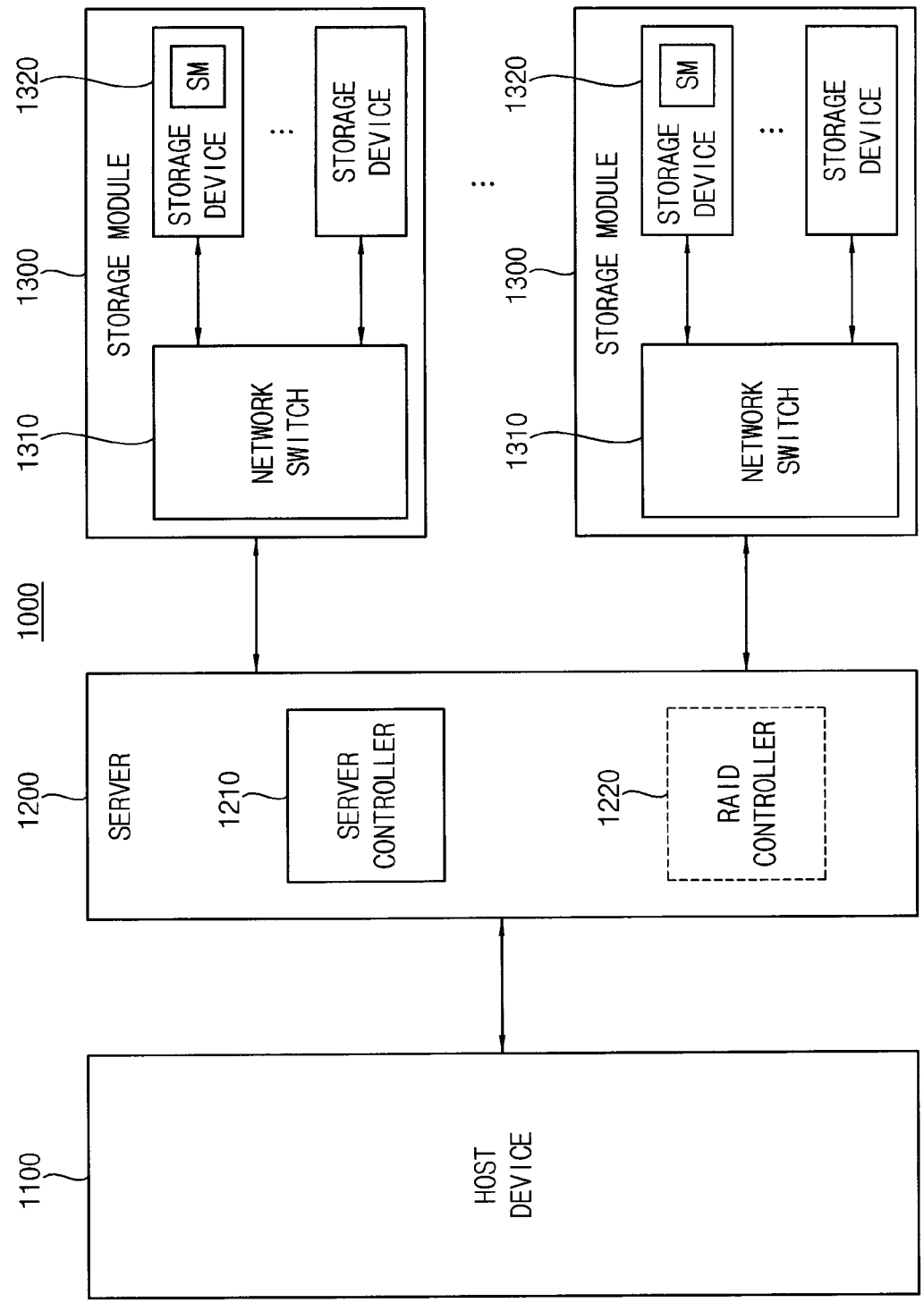

METHOD OF OPERATING NETWORK-BASED STORAGE DEVICE, METHOD OF OPERATING STORAGE SYSTEM USING THE SAME AND STORAGE MODULE PERFORMING THE SAME

CROSS-REFERENCE TO RELATED APPLICATION

This is a Continuation of U.S. application Ser. No. 17/478,480, filed Sep. 17, 2021, now U.S. Pat. No. 11,516,292, issued Nov. 29, 2022, which is a Continuation of U.S. application Ser. No. 17/003,265, filed Aug. 26, 2020, now U.S. Pat. No. 11,146,636, issued Oct. 12, 2021, and a claim of priority under 35 USC § 119 is made to Korean Patent Application No. 10-2020-0000589, filed on Jan. 3, 2020 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of operating network-based storage devices, methods of operating storage systems using the methods of operating network-based storage devices, and storage modules performing the methods of operating network-based storage devices.

2. Description of the Related Art

Certain types of data storage devices include one or more semiconductor memory devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Recently, various systems, e.g., a laptop computer, a car, an airplane, a drone, etc., have adopted the SSDs for data storage.

Recently, network-based storage devices and a storage system including the network-based storage devices, in which storage devices and a host device are connected with each other through a network such as an Ethernet without physically connecting the storage devices with the host device, have been researched.

SUMMARY

At least one example embodiment of the present disclosure provides a method of operating network-based storage devices capable of efficiently managing the network-based storage devices.

At least one example embodiment of the present disclosure provides a method of operating a storage system using the method of operating the network-based storage devices.

At least one example embodiment of the present disclosure provides a storage module performing the method of operating the network-based storage devices.

According to example embodiments, in a method of operating network-based storage devices, a first storage device having a first local key among a plurality of storage devices is set as a first main storage device. The storage devices are connected to each other through a network. A volume of at least a part of the plurality of storage devices is set and managed by the first storage device based on a first control signal received from an external host device. A second local key is received by the first storage device from a second storage device having the second local key among the plurality of storage devices. The first local key and the second local key are transmitted by the first storage device to the external host device.

According to example embodiments, in a method of operating a storage system including a plurality of storage devices and a host device, the storage devices are connected to each other through a first network. The host device is connected to the plurality of storage devices through a second network. A first storage device having a first local key among the plurality of storage devices is set as a first main storage device. A first control signal for setting and managing volumes of the plurality of storage devices is transmitted by the host device to the first storage device. A volume of at least a part of the plurality of storage devices is set and managed by the first storage device based on the first control signal. A second local key is received by the first storage device from a second storage device having the second local key among the plurality of storage devices. The first local key and the second local key are transmitted by the first storage device to the host device. A command, an address and the second local key for accessing the second storage device are transmitted by the host device to the first storage device. The command, the address and the second local key are transmitted by the first storage device to the second storage device. Read data is provided by the second storage device to the host device or write data is received by the second storage device from the host device based on the command, the address, and the second local key. An operation in which the first storage device receives the second local key from the second storage device and an operation in which the first storage device transmits the command, the address and the second local key to the second storage device are performed based on a peer-to-peer (P2P) scheme between the first storage device and the second storage device without passing through the host device.

According to example embodiments, a storage module includes an Ethernet switch and a plurality of storage devices connected to each other through the Ethernet switch. A first storage device having a first local key among the plurality of storage devices is set as a first main storage device. The first storage device includes a storage manager. The storage manager sets and manages a volume of at least a part of the plurality of storage devices based on a first control signal received from an external host device, receives a second local key from a second storage device having the second local key among the plurality of storage devices, and transmits the first local key and the second local key to the external host device.

In the method of operating the network-based storage devices and the method of operating the storage system and the storage module according to example embodiments, at least one of the plurality of storage devices connected to each other through the network may be set as the main storage device and the remaining storage devices other than the main storage device may be managed by the main storage device. In addition, the main storage device may set and manage the volumes of the plurality of storage devices and the main storage device and the remaining storage devices may exchange data (e.g., the local key) based on the P2P scheme. Accordingly, the main storage device may configure and manage the volumes of all storage devices without an additional external controller and the network-based storage devices may be efficiently managed without increasing costs.

BRIEF DESCRIPTION OF THE DRAWINGS

Illustrative, non-limiting example embodiments will be more clearly understood from the following detailed description taken in conjunction with the accompanying drawings.

FIGS. 6A, 6B and 6C are diagrams for describing a method of operating network-based storage devices of FIG. 1.

FIGS. 8A, 8B and 8C are diagrams for describing an operation of setting and managing volumes of a plurality of storage devices of FIG. 7.

FIGS. 11A and 11B are diagrams for describing an operation of FIG. 10.

FIG. 12 is a flowchart illustrating another example of receiving a command, an address and a local key and an example of accessing a target storage device in FIG. 9.

FIGS. 13A, 13B and 13C are diagrams for describing an operation of FIG. 12.

FIGS. 22A, 22B and 22C are diagrams for describing a method of operating network-based storage devices of FIG. 21.

FIG. 25 is a block diagram illustrating a storage server including a storage device according to example embodiments.

DETAILED DESCRIPTION OF THE EMBODIMENTS

Figure 1:
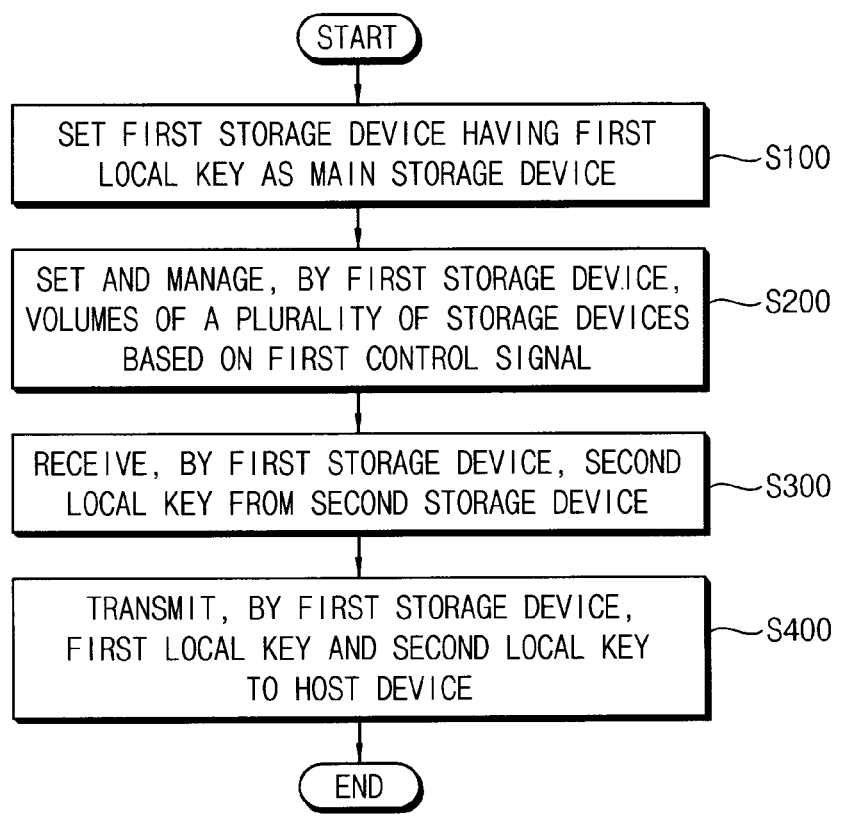
FIG. 1 is a flowchart illustrating a method of operating network-based storage devices according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of operating network-based storage devices according to example embodiments.

Referring to FIG. 1, storage devices are connected to each other through a network, such as Ethernet, to perform a method of operating network-based storage devices according to example embodiments. Configurations of the plurality of storage devices and a storage system including the plurality of storage devices will be described with reference to FIG. 2.

In the method of operating the network-based storage devices according to example embodiments, a first storage device having a first local key among the plurality of storage devices is set as a main storage device (step S100). The first local key may be used by an external host device for accessing the first storage device and may be referred to as a first reference key.

The first storage device sets and manages volumes (or capacities) of the plurality of storage devices based on a first control signal received from the external host device (step S200). For example, the volumes of the plurality of storage devices may be set and managed based on a logical volume implementation (or configuration) scheme or a virtual volume implementation scheme by virtualization. For example, the first storage device may set and manage the volumes of all of the plurality of storage devices or the volume of at least a part of the plurality of storage devices.

The first storage device receives a second local key from a second storage device having the second local key among the plurality of storage devices (step S300). For example, an operation in which the first storage device receives the second local key from the second storage device may be performed based on a peer-to-peer (P2P) scheme between the first storage device and the second storage device without passing through the host device.

The first storage device transmits the first local key and the second local key to the external host device (step S400). As will be described with reference to FIG. 9, the external host device may access the first storage device and the second storage device using the first local key and the second local key.

Although FIG. 1 illustrates that the first storage device receives only the second local key in step S300 and the first storage device transmits only the first and second local keys in step S400 for convenience of illustration, example embodiments are not limited thereto. For example, step S300 may be described as the first storage device receiving local keys from all storage devices managed by itself, and step S400 may be described as the first storage device transmitting its own local key and the local keys received in step S300 to the external host device.

In the method of operating the network-based storage devices according to example embodiments, at least one of the plurality of storage devices connected to each other through the network may be set as the main storage device (or a master storage device), and the remaining storage devices (or slave storage devices) other than the main storage device may be managed by the main storage device. In addition, the main storage device may set and manage the volumes of the plurality of storage devices, and the main storage device and the remaining storage devices may exchange data (e.g., the local key) based on the P2P scheme. Accordingly, the main storage device may configure and manage the volumes of all storage devices without an additional external controller, and the network-based storage devices may be efficiently managed without increasing costs.

Figure 2:
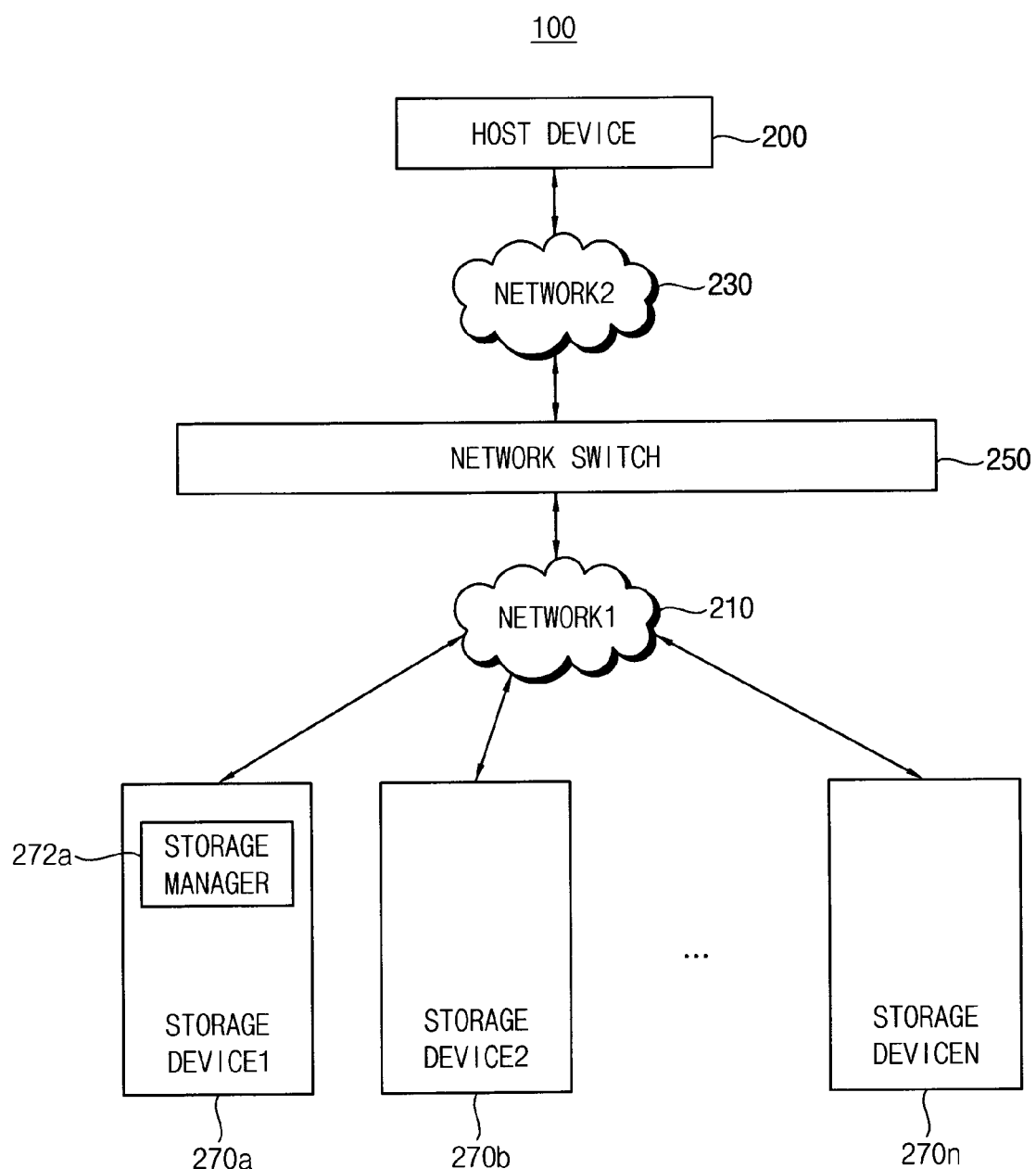
FIG. 2 is a block diagram illustrating a storage device and a storage system including the storage device according to example embodiments.

FIG. 2 is a block diagram illustrating a storage device and a storage system including the storage device according to example embodiments.

Referring to FIG. 2, a storage system 100 includes a host device 200, a network switch 250 and a plurality of storage devices 270a, 270b, ..., 270n. The storage system 100 may further include a first network 210 and a second network 230.

The host device 200 controls overall operations of the storage system 100. Although not illustrated in FIG. 2, the host device 200 may include a host processor and a host memory. The host processor may control an operation of the host device 200. For example, the host processor may execute an operating system (OS). The host memory may store instructions and/or data that are executed and/or processed by the host processor. For example, the operating system executed by the host processor may include a file system for file management and a device driver for controlling peripheral devices including the plurality of storage devices 270a to 270n at the operating system level.

The plurality of storage devices 270a to 270n are accessed by the host device 200. The plurality of storage devices 270a to 270n may perform the method according to example embodiments described with reference to FIG. 1. For example, the first storage device 270a among the plurality of storage devices 270a to 270n may be set as a main storage device, and the first storage device 270a may perform a volume setting and managing operation, a local key receiving operation, and a local key transmitting operation. The first storage device 270a may include a storage manager 272a for performing the above-described operations. A configuration of each of the plurality of storage devices 270a to 270n will be described with reference to FIG. 3.

Although FIG. 2 illustrates that only the first storage device 270a includes the storage manager 272a for convenience of illustration, example embodiments are not limited thereto. For example, each of the plurality of storage devices 270a to 270n may include a storage manager, and only the storage manager 272a included in the first storage device 270a set as the main storage device may be activated.

The plurality of storage devices 270a to 270n are connected to each other through the first network 210. The plurality of storage devices 270a to 270n may be connected to the host device 200 through the second network 230. The network switch 250 may connect the plurality of storage devices 270a to 270n with each other through the first network 210 and may connect the plurality of storage devices 270a to 270n with the host device 200 through the second network 230.

The network switch 250 and the plurality of storage devices 270a to 270n connected to each other through the network switch 250 may form one storage module.

In some example embodiments, each of the first network 210 and the second network 230 may be an Ethernet, and the network switch 250 may be an Ethernet switch. However, example embodiments are not limited thereto, and each of the first network 210 and the second network 230 may be one of various wired/wireless networks such as a local area network (LAN), a wide area network (WAN), Wi-Fi, or the like.

In some example embodiments, all of the plurality of storage devices 270a to 270n may be disposed or located in a first space (e.g., in the same space). In other example embodiments, some of the plurality of storage devices 270a to 270n may be disposed in a first space (e.g., a local space), and the other of the plurality of storage devices 270a to 270n may be disposed in a second space (e.g., a remote space) apart from the first space. For example, the same space may represent the same office on the same floor in the same building and the different spaces apart from each other may represent offices on different floors in the same building or offices in different buildings. When the network-based storage devices that are physically spaced from each other are driven according to example embodiments, a storage device capable of being efficiently operated may be selected and implemented as the main storage device.

Figure 3:
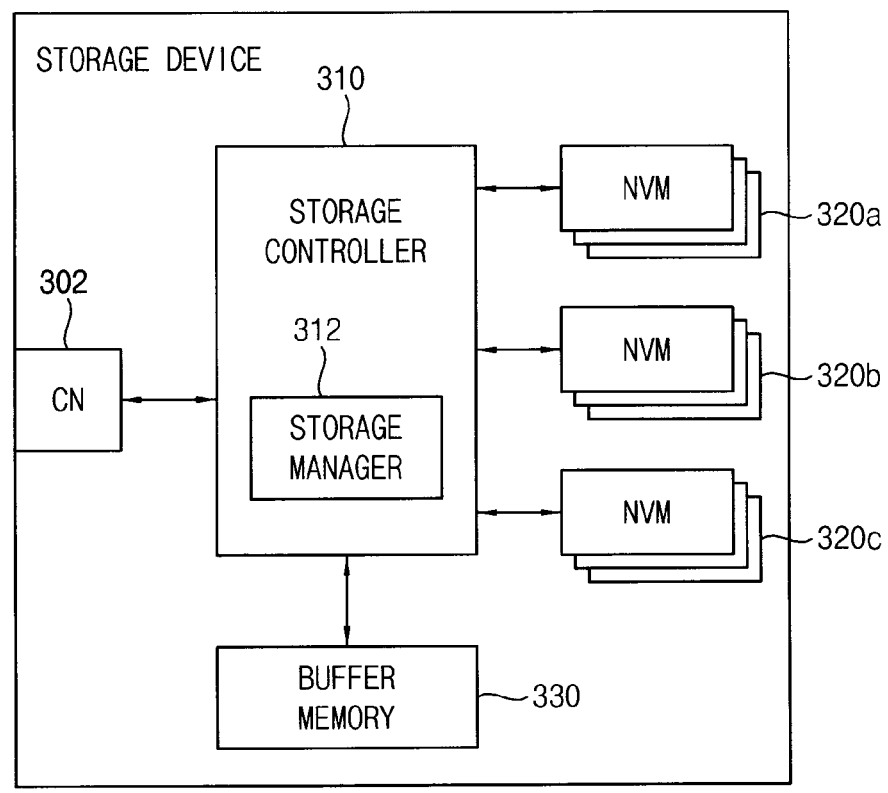
FIG. 3 is a block diagram illustrating a storage device according to example embodiments.

FIG. 3 is a block diagram illustrating a storage device according to example embodiments.

Referring to FIG. 3, a storage device 300 may include a connector (CN) 302, a storage controller 310, a plurality of nonvolatile memories (NVMs) 320a, 320b and 320c, and a buffer memory 330.

The storage controller 310 may control an operation of the storage device 300 and/or operations of the plurality of nonvolatile memories 320a, 320b and 320c based on a command, an address and data that are received from a host device (e.g., the host device 200 in FIG. 2).

The storage controller 310 may include a storage manager 312. The storage manager 312 may correspond to the storage manager 272a included in the first storage device 270a of FIG. 2 and may perform the method according to example embodiments described with reference to FIG. 1. However, example embodiments are not limited thereto, and the storage manager 312 may be implemented as a separate component outside the storage controller 310.

The plurality of nonvolatile memories 320a, 320b and 320c may store a plurality of data. For example, the plurality of nonvolatile memories 320a, 320b and 320c may store meta data, various user data, or the like.

In some example embodiments, each of the plurality of nonvolatile memories 320a, 320b and 320c may include a NAND flash memory. In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310 and may temporarily store data stored in or to be stored into the plurality of nonvolatile memories 320a, 320b and 320c. For example, the buffer memory 330 may include at least one of various volatile memories, e.g., a dynamic random access memory (DRAM), a static random access memory (SRAM), or the like.

The connector 302 may connect the storage device 300 with a network switch (e.g., the network switch 250 in FIG. 2). For example, the connector 302 may include a socket into which a wired cable connecting the storage device 300 with the network switch 250 is inserted, or a wireless communication module for connecting the storage device 300 with the network switch 250.

In some example embodiments, the storage device 300 may be a solid state drive (SSD). For example, the storage device 300 may be an Ethernet-based SSD that exchanges signals and data based on a network, that is, an Ethernet. In other example embodiments, the storage device 300 may be one of a universal flash storage (UFS), a multi media card (MMC), an embedded multi media card (eMMC), a secure digital (SD) card, a micro SD card, a memory stick, a chip card, a universal serial bus (USB) card, a smart card, a compact flash (CF) card, or the like.

In some example embodiments, the storage device 300 may be connected to the host device 200 through a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 320a, 320b and 320c to provide the block accessible interface to the host device 200, for allowing the access by units of a memory block with respect to data stored in the plurality of nonvolatile memories 320a, 320b and 320c.

In some example embodiments, a storage system (e.g., the storage system 100 in FIG. 2) including the storage device 300 may be any computing system, such as a personal computer (PC), a server computer, a data center, a workstation, a digital television, a set-top box, a navigation system, etc. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 4A:
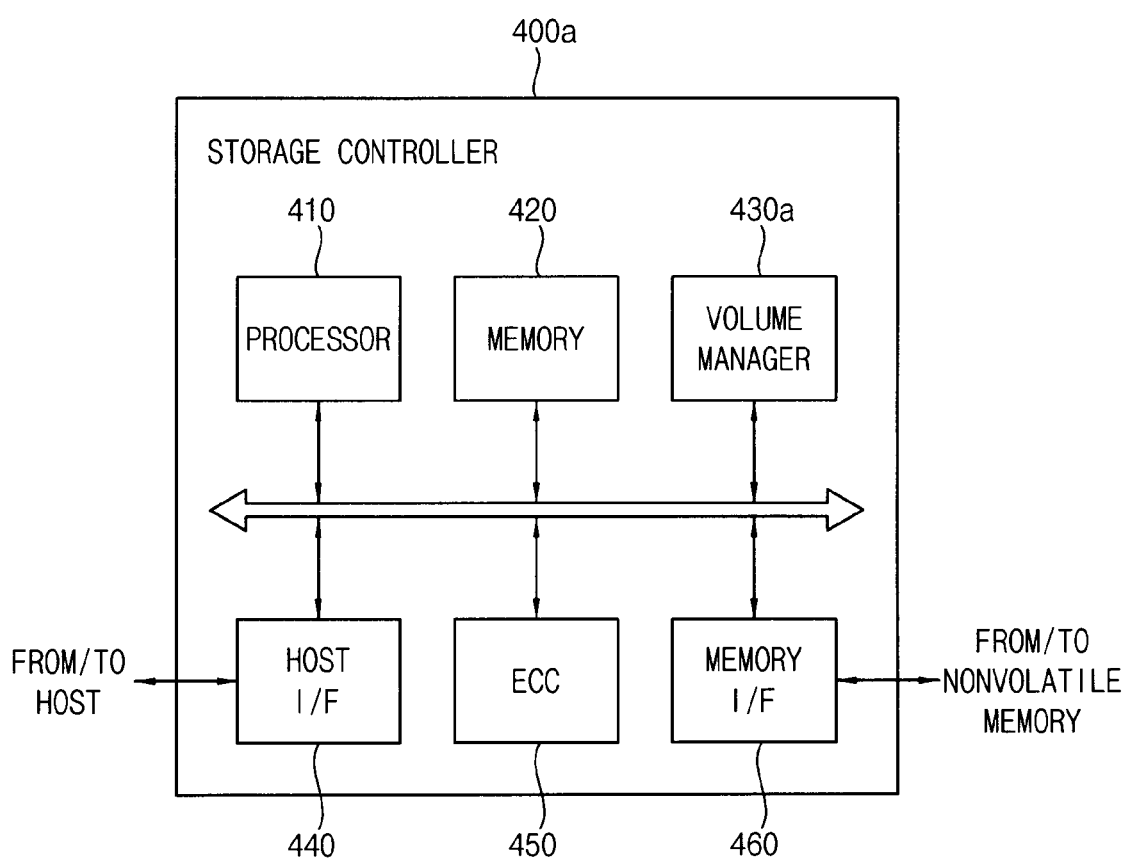
FIGS. 4A and 4B are block diagrams illustrating examples of a storage controller included in a storage device according to example embodiments.
Figure 4B:
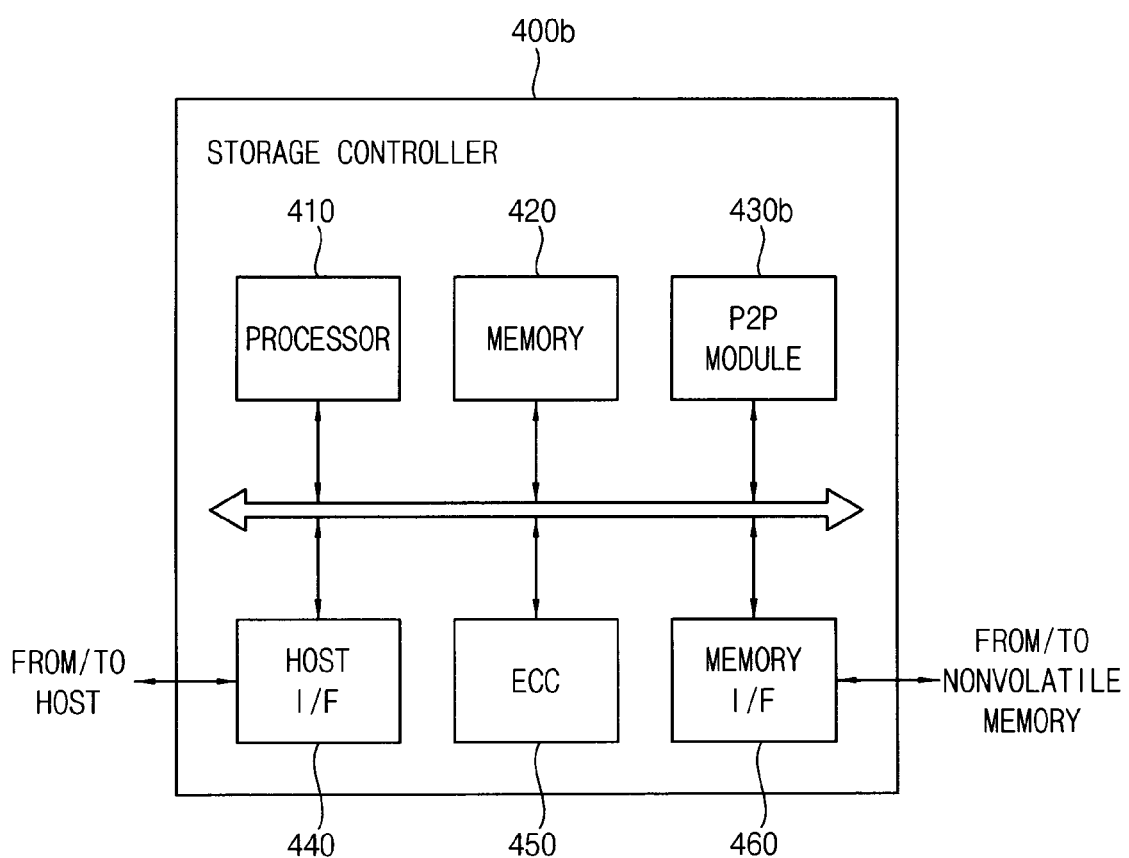

FIGS. 4A and 4B are block diagrams illustrating examples of a storage controller included in a storage device according to example embodiments.

Referring to FIG. 4A, a storage controller 400a may include at least one processor 410, a memory 420, a volume manager 430a, a host interface 440, an error correction code (ECC) block 450 and a memory interface 460.

The processor 410 may control an operation of the storage controller 400a in response to a command received via the host interface 440 from a host device (e.g., the host device 200 in FIG. 2). In some example embodiments, the processor 410 may control respective components by employing firmware for operating a storage device (e.g., the storage device 300 in FIG. 3).

The memory 420 may store instructions and data executed and processed by the processor 410. For example, the memory 420 may be implemented with a volatile memory with relatively small capacity and high speed, such as a static random access memory (SRAM), a cache memory, or the like.

The volume manager 430a may be configured to correspond to the storage manager 312 in FIG. 3. In other words, the storage manager 312 may be implemented in the form of the volume manager 430a in the example of FIG. 4A. The volume manager 430a may set and manage volumes of a plurality of storage devices (e.g., the plurality of storage devices 270a to 270n in FIG. 2) based on the logical volume implementation scheme or the virtual volume implementation scheme by virtualization. In addition, the volume manager 430a may control to transmit a local key based on the P2P scheme between the plurality of storage devices 270a to 270n.

The ECC block 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device 200 and the storage device 300. The host interface 440 may provide an interface corresponding to a bus format of the host for communication between the host device 200 and the storage device 300. In some example embodiments, the bus format of the host device 200 may be a small computer system interface (SCSI) or a serial attached SCSI (SAS) interface. In other example embodiments, the bus format of the host device 200 may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 460 may exchange data with nonvolatile memories (e.g., the nonvolatile memories 320a, 320b and 320c in FIG. 2). The memory interface 460 may transfer data to the nonvolatile memories 320a, 320b and 320c, or may receive data read from the nonvolatile memories 320a, 320b and 320c. In some example embodiments, the memory interface 460 may be connected to the nonvolatile memories 320a, 320b and 320c via one channel. In other example embodiments, the memory interface 460 may be connected to the nonvolatile memories 320a, 320b and 320c via two or more channels.

Referring to FIG. 4B, a storage controller 400b of FIG. 4B may be substantially the same as the storage controller 400a of FIG. 4A, except that the volume manager 430a in FIG. 4A is changed to a P2P module 430b in FIG. 4B.

The P2P module 430b may be configured to correspond to the storage manager 312 in FIG. 3. In other words, the storage manager 312 may be implemented in the form of the P2P module 430b in the example of FIG. 4B. The P2P module 430b may control to transmit a local key based on the P2P scheme between the plurality of storage devices 270a to 270n. In addition, the P2P module 430b may set and manage the volumes of the plurality of storage devices 270a to 270n in FIG. 2.

In some example embodiments, at least a part of the volume manager 430a in FIG. 4A and/or the P2P module 430b in FIG. 4B may be implemented as hardware. For example, at least a part of the volume manager 430a and/or the P2P module 430b may be included in a computer-based electronic system. In other example embodiments, at least a part of the volume manager 430a in FIG. 4A and/or the P2P module 430b in FIG. 4B may be implemented as instruction codes or program routines (e.g., a software program). For example, the instruction codes or the program routines may be executed by a computer-based electronic system and may be stored in any storage device located inside or outside the computer-based electronic system.

Figure 5:
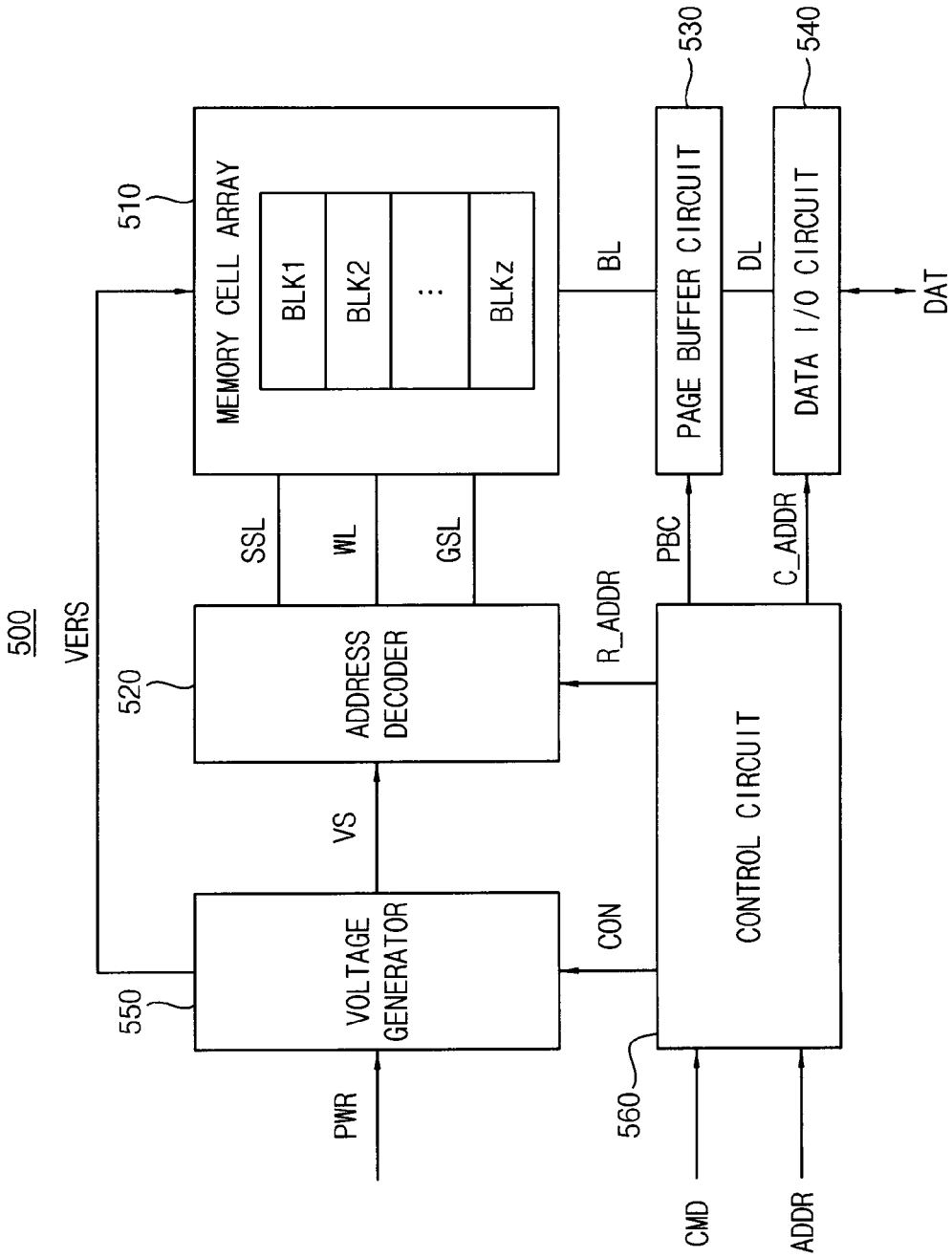
FIG. 5 is a block diagram illustrating an example of a nonvolatile memory included in a storage device according to example embodiments.

FIG. 5 is a block diagram illustrating an example of a nonvolatile memory included in a storage device according to example embodiments.

Referring to FIG. 5, a nonvolatile memory 500 includes a memory cell array 510, an address decoder 520, a page buffer circuit 530, a data input/output (I/O) circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

In some example embodiments, the plurality of memory cells may be arranged in a two dimensional (2D) array structure or a three dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from the outside (e.g., the host device 200 in FIG. 2 and/or the storage controller 310 in FIG. 3) and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline and may determine the rest or remainder of the plurality of wordlines WL other than the selected wordline as unselected wordlines, based on the row address R_ADDR.

In addition, in the data erase/write/read operations, the address decoder 520 may determine at least one of the plurality of string selection lines SSL as a selected string selection line and may determine the rest or remainder of the plurality of string selection lines SSL other than the selected string selection line as unselected string selection lines, based on the row address R_ADDR.

Further, in the data erase/write/read operations, the address decoder 520 may determine at least one of the plurality of ground selection lines GSL as a selected ground selection line and may determine the rest or remainder of the plurality of ground selection lines GSL other than the selected ground selection line as unselected ground selection lines, based on the row address R_ADDR.

The voltage generator 550 may generate voltages VS that are required for an operation of the nonvolatile memory 500 based on received power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from an outside of the nonvolatile memory 500 to the memory cell array 510 via the page buffer circuit 530 or may provide the data DAT from the memory cell array 510 to the outside of the nonvolatile memory 500, based on the column address C_ADDR.

Figure 6A:
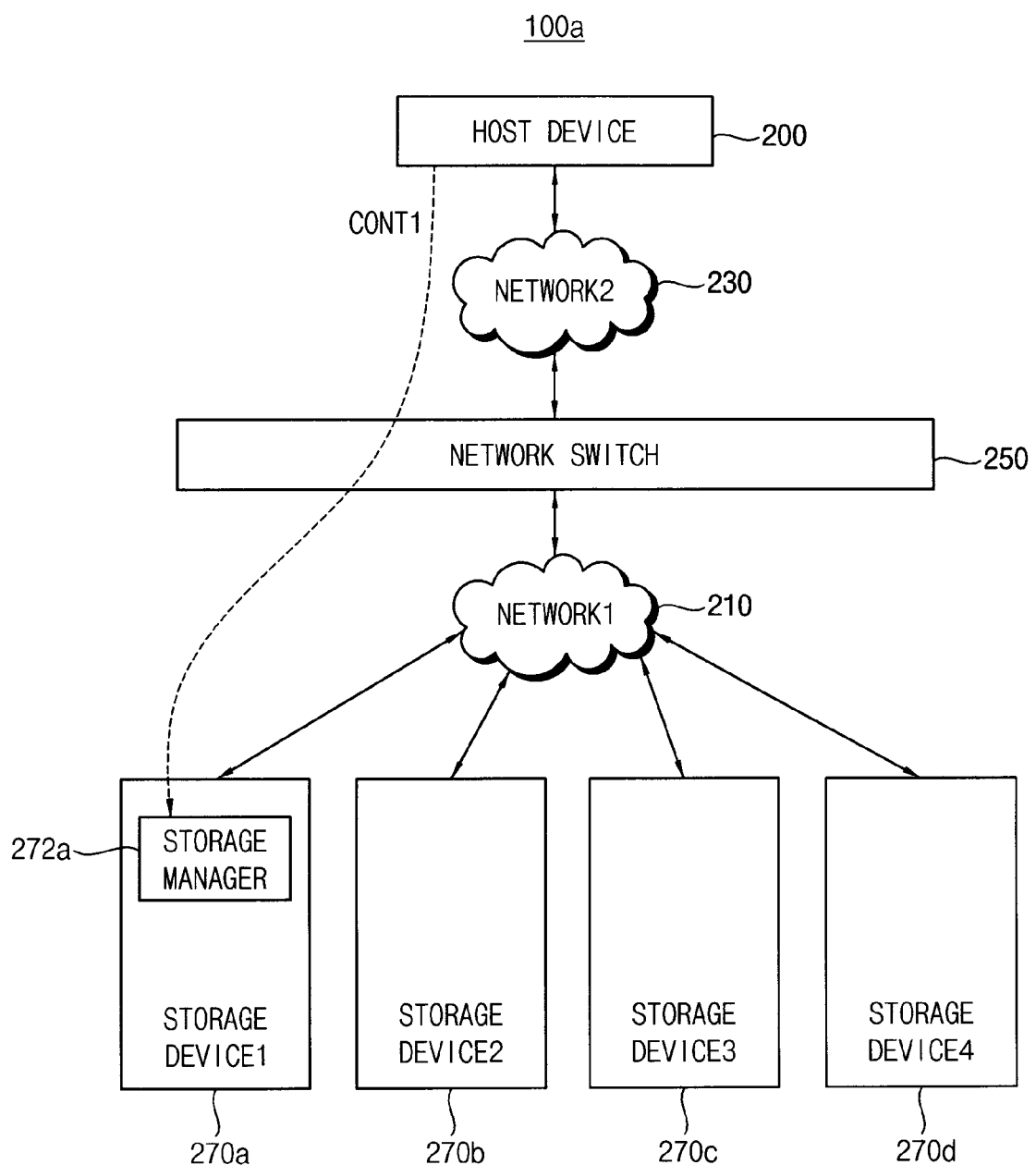
Figure 6B:
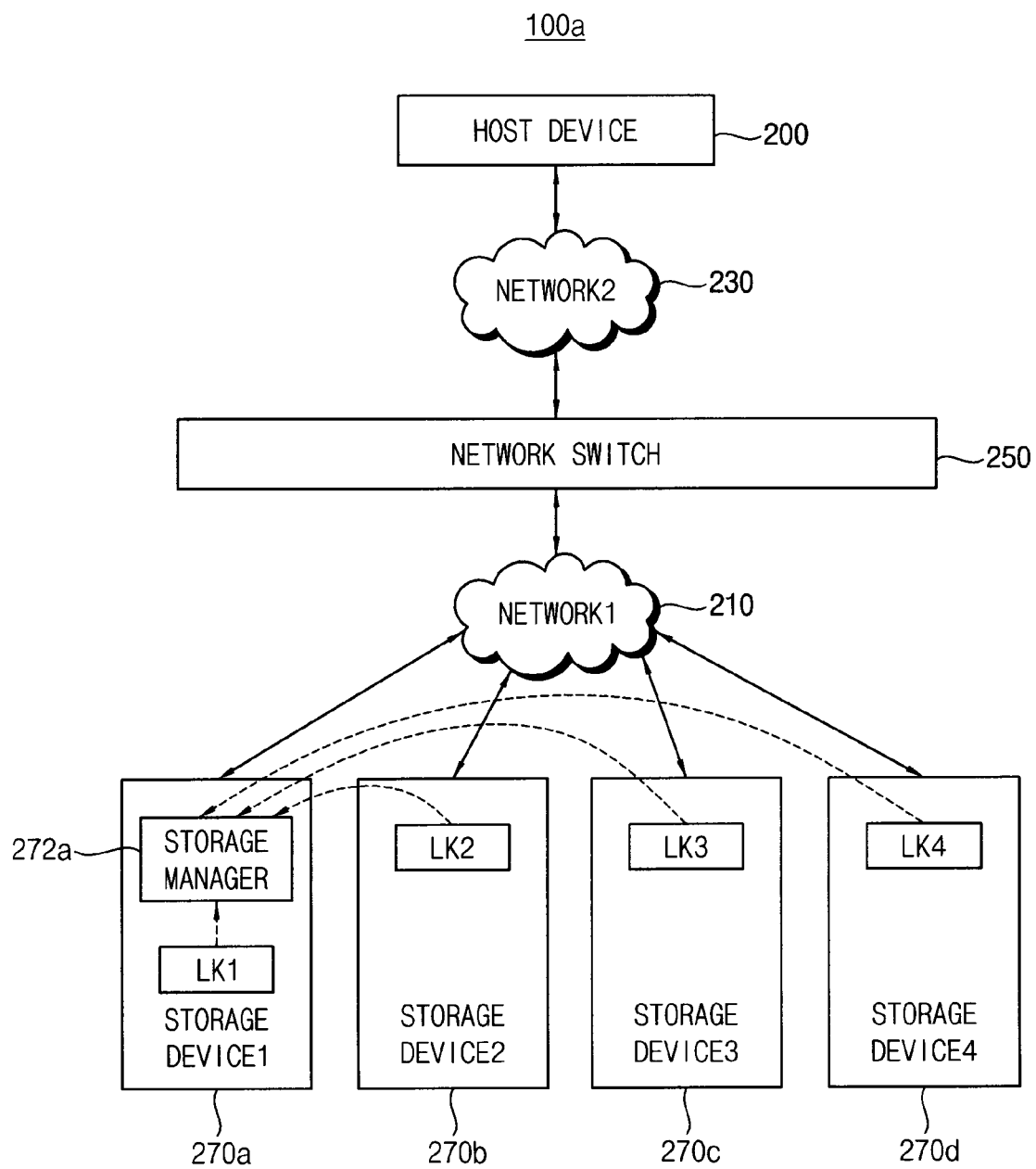

FIGS. 6A, 6B and 6C are diagrams for describing a method of operating network-based storage devices of FIG. 1. In FIGS. 6A, 6B and 6C and subsequent figures, example embodiments will be described based on a case where the storage system 100a includes four storage devices 270a, 270b, 270c and 270d for convenience of description.

Referring to FIGS. 1 and 6A, after the first storage device 270a is set as the main storage device (step S100), the host device 200 may transmit a first control signal CONT1 to the first storage device 270a. The first control signal CONT1 may be provided to the storage manager 272a of the first storage device 270a through the second network 230, the network switch 250 and the first network 210. The first control signal CONT1 may be a signal for setting, controlling, and managing the volumes of the plurality of storage devices 270a to 270d.

After that, as described with reference to step S200, the storage manager 272a of the first storage device 270a may set and manage the volumes of the plurality of storage devices 270a to 270d based on the first control signal CONT1. Step S200 will be described in detail with reference to FIG. 7.

Referring to FIGS. 1 and 6B, as described with reference to step S300, the first storage device 270a may receive local keys LK2, LK3 and LK4 from the remaining storage devices 270b to 270d that are managed by the first storage device 270a. The local keys LK2 to LK4 may be provided to the storage manager 272a of the first storage device 270a through the first network 210 and the network switch 250. As described above, the local keys LK2 to LK4 may be transmitted based on the P2P scheme and may be directly transferred from the storage devices 270b to 270d to the first storage device 270a through the network switch 250 without passing through the host device 200. In addition, the first storage device 270a may also provide its own local key LK1 to the storage manager 272a.

The local key (or reference key) may be a specific, unique, and/or intrinsic key or the storage device and may include memory region (or area) access information and/or pointer information required for the host device 200 to access the storage device. For example, the local key may be a remote direct memory access (RDMA) key. For example, the RDMA key may be a user datagram protocol (UDP) based RDMA over converged Ethernet v2 (RoCEv2) key, or a transmission control protocol (TCP) based Internet wide area RDMA protocol (iWARP) key but may not be limited thereto.

Referring to FIGS. 1 and 6C, as described with reference to step S400, the first storage device 270a may transmit the local keys LK1 to LK4 to the host device 200. The local keys LK1 to LK4 may be provided to the host device 200 through the first network 210, the network switch 250 and the second network 230.

After that, as will be described with reference to FIG. 9, the host device 200 may access at least one of the plurality of storage devices 270a to 270d using at least one of the local keys LK1 to LK4.

Figure 7:
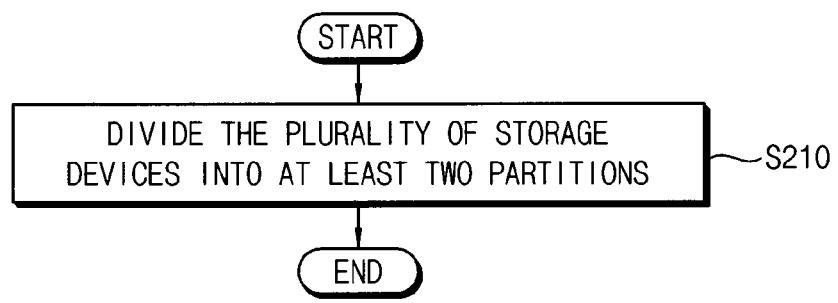
FIG. 7 is a flowchart illustrating an example of setting and managing volumes of a plurality of storage devices in FIG. 1.
Figure 8A:
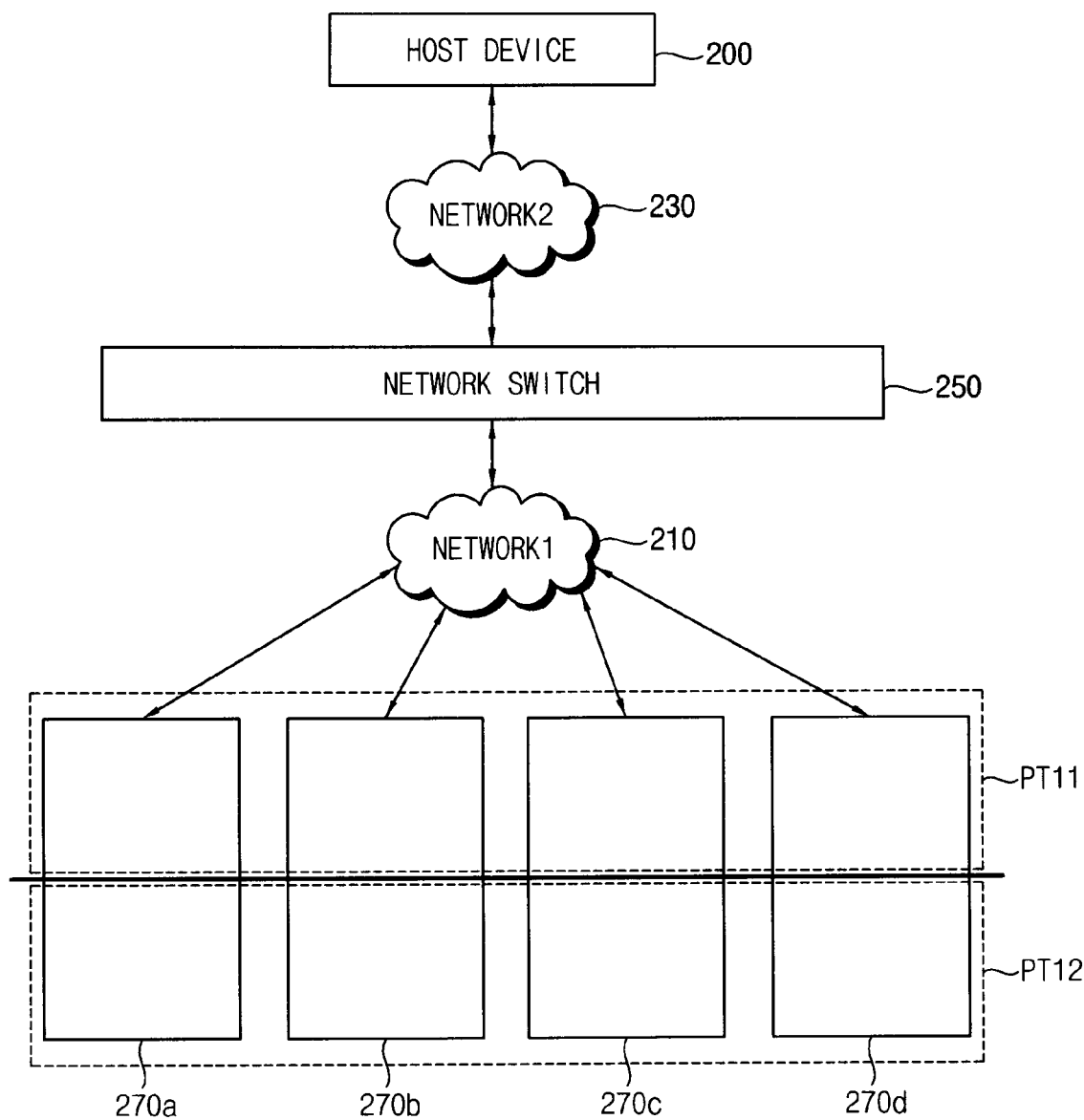
Figure 8B:
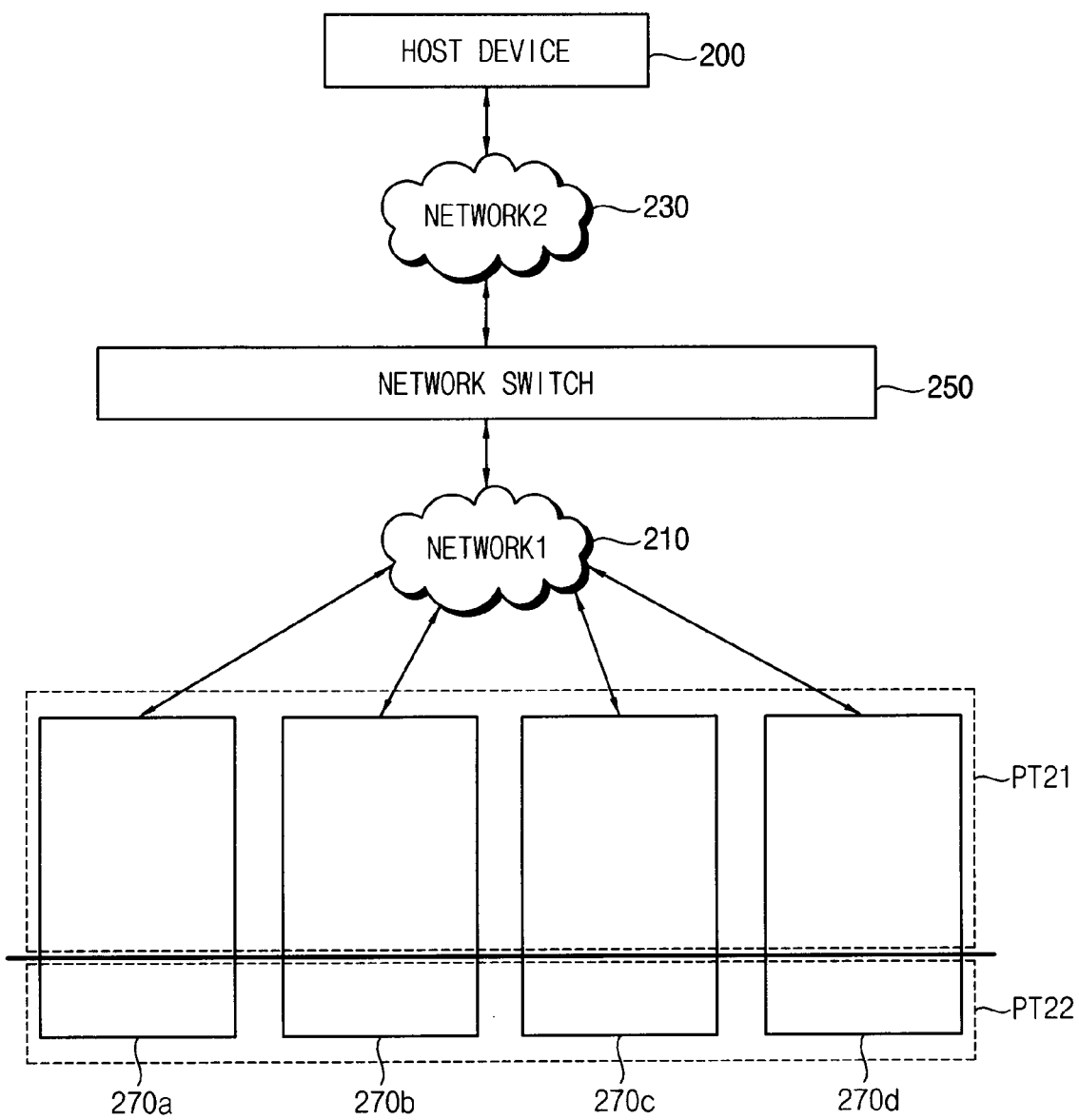

FIG. 7 is a flowchart illustrating an example of setting and managing volumes of a plurality of storage devices in FIG. 1. FIGS. 8A, 8B and 8C are diagrams for describing an operation of setting and managing volumes of a plurality of storage devices of FIG. 7.

Referring to FIGS. 1 and 7, when setting and managing the volumes of the plurality of storage devices (step S200), the plurality of storage devices may be divided into at least two partitions (step S210). For example, the plurality of storage devices may be divided into a plurality of partitions based on the logical volume implementation scheme or the virtual volume implementation scheme by virtualization.

According to example embodiments, the operation of setting and managing the volumes of the plurality of storage devices may be performed at an initial operation time (e.g., at a boot time), or may be performed by a user request while driving the plurality of storage devices.

Hereinafter, step S210 will be described in detail based on a case where the plurality of storage devices is divided into two partitions.

Referring to FIG. 8A, the plurality of storage devices 270a to 270d may be divided into a first partition PT11 having a first volume and a second partition PT12 having a second volume. In the example of FIG. 8A, each of the first partition PT11 and the second partition PT12 may be set to correspond to all of the plurality of storage devices 270a to 270d. For example, the first partition PT11 may include a portion of all of the plurality of storage devices 270a to 270d, and the second partition PT12 may include the other portion of all of the plurality of storage devices 270a to 270d. In addition, the first volume of the first partition PT11 and the second volume of the second partition PT12 may be substantially equal to or the same as each other.

Referring to FIG. 8B, the plurality of storage devices 270a to 270d may be divided into a first partition PT21 having a first volume and a second partition PT22 having a second volume. In the example of FIG. 8B, each of the first partition PT21 and the second partition PT22 may be set to correspond to all of the plurality of storage devices 270a to 270d. In addition, the first volume of the first partition PT21 and the second volume of the second partition PT22 may be different from each other.

Referring to FIG. 8C, the plurality of storage devices 270a to 270d may be divided into a first partition PT31 having a first volume and a second partition PT32 having a second volume. In the example of FIG. 8C, each of the first partition PT31 and the second partition PT32 may be set to correspond to only some of the plurality of storage devices 270a to 270d. For example, the first partition PT31 may include all of the storage devices 270a and 270, and the second partition PT32 may include all of the other storage devices 270c and 270d. In addition, the first volume of the first partition PT31 and the second volume of the second partition PT32 may be substantially equal to each other.

Although not illustrated in FIG. 8C, when each of partitions is set to correspond to only some of the plurality of storage devices 270a to 270d, the partitions may have different volumes. Although FIGS. 8A, 8B and 8C illustrate that the plurality of storage devices is divided into two partitions, example embodiments are not limited thereto, and the number of partitions can be variously changed according to example embodiments.

Figure 9:
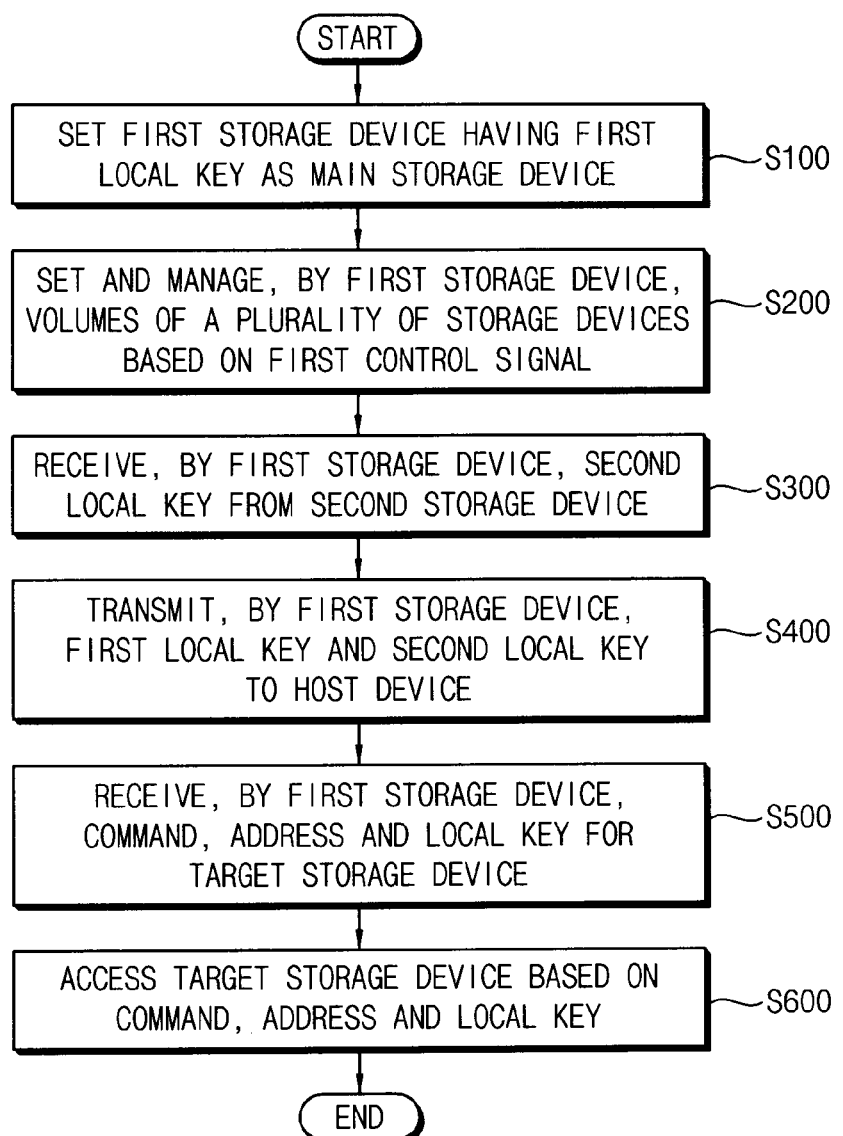
FIG. 9 is a flowchart illustrating a method of operating network-based storage devices according to example embodiments.

FIG. 9 is a flowchart illustrating a method of operating network-based storage devices according to example embodiments. The descriptions repeated with FIG. 1 will be omitted.

Referring to FIG. 9, in a method of operating network-based storage devices according to example embodiments, steps S100, S200, S300 and S400 in FIG. 9 may be substantially the same as steps S100, S200, S300 and S400 in FIG. 1, respectively.

The first storage device receives a command, an address and a local key for accessing a target storage device from the external host device (step S500), and the target storage device is accessed based on the received command, the received address, and the received local key (step S600). For example, the target storage device may be the first storage device, or at least one of the remaining storage devices managed by the first storage device among the plurality of storage devices. Operations of steps S500 and S600 may be changed depending on the target storage device, which will be described with reference to FIGS. 10, 12 and 14.

Figure 10:
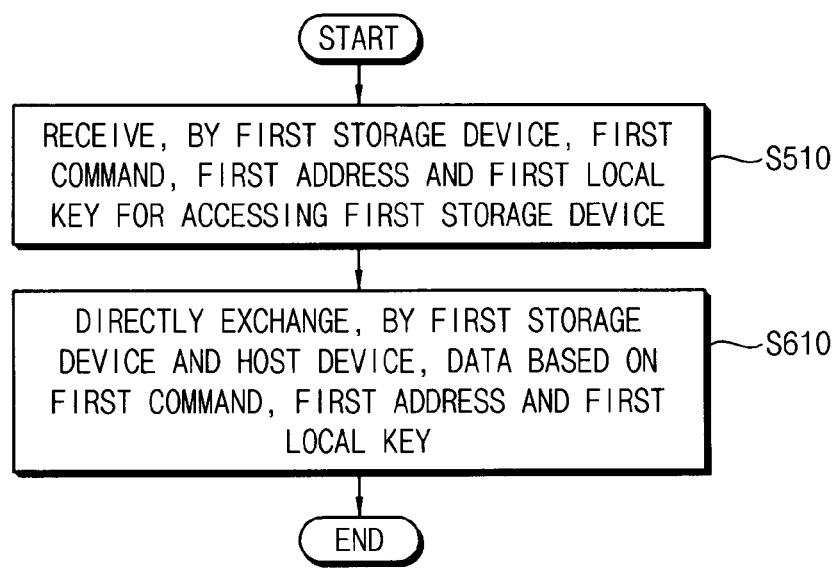
FIG. 10 is a flowchart illustrating an example of receiving a command, an address and a local key and an example of accessing a target storage device in FIG. 9.
Figure 11B:
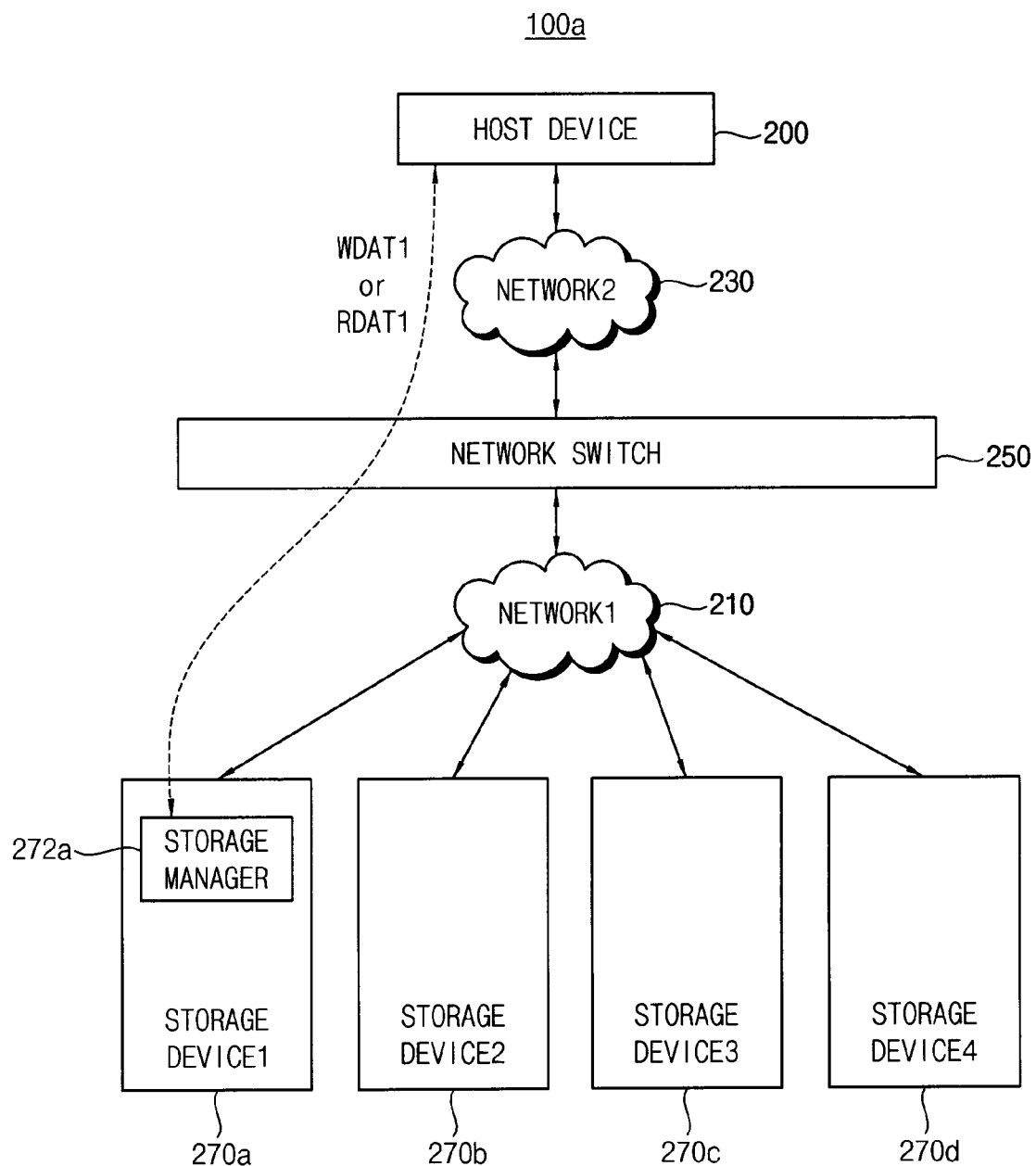

FIG. 10 is a flowchart illustrating an example of receiving a command, an address and a local key and an example of accessing a target storage device in FIG. 9. FIGS. 11A and 11B are diagrams for describing an operation of FIG. 10.

Referring to FIGS. 9, 10, 11A and 11B, when receiving the command, the address and the local key for accessing the target storage device (step S500), the first storage device 270a may receive a first command CMD1, a first address ADDR1 and the first local key LK1 for accessing the first storage device 270a from the host device 200 (step S510). In other words, FIGS. 10, 11A and 11B illustrate an example where the first storage device 270a is the target storage device.

When accessing the target storage device (step S600), the first storage device 270a and the host device 200 may directly exchange data based on the first command CMD1, the first address ADDR1 and the first local key LK1 (step S610). For example, when the first command CMD1 is a write command, first write data WDAT1 to be stored in the first storage device 270a may be directly provided from the host device 200 to the first storage device 270a. When the first command CMD1 is a read command, first read data RDAT1 stored in the first storage device 270a may be obtained (or retrieved) and directly provided from the first storage device 270a to the host device 200. For example, a memory region in which the first write data WDAT1 is to be stored and/or a memory region in which the first read data RDAT1 is stored may be accessed by a combination of the first address ADDR1 and the first local key LK1.

Figure 13A:
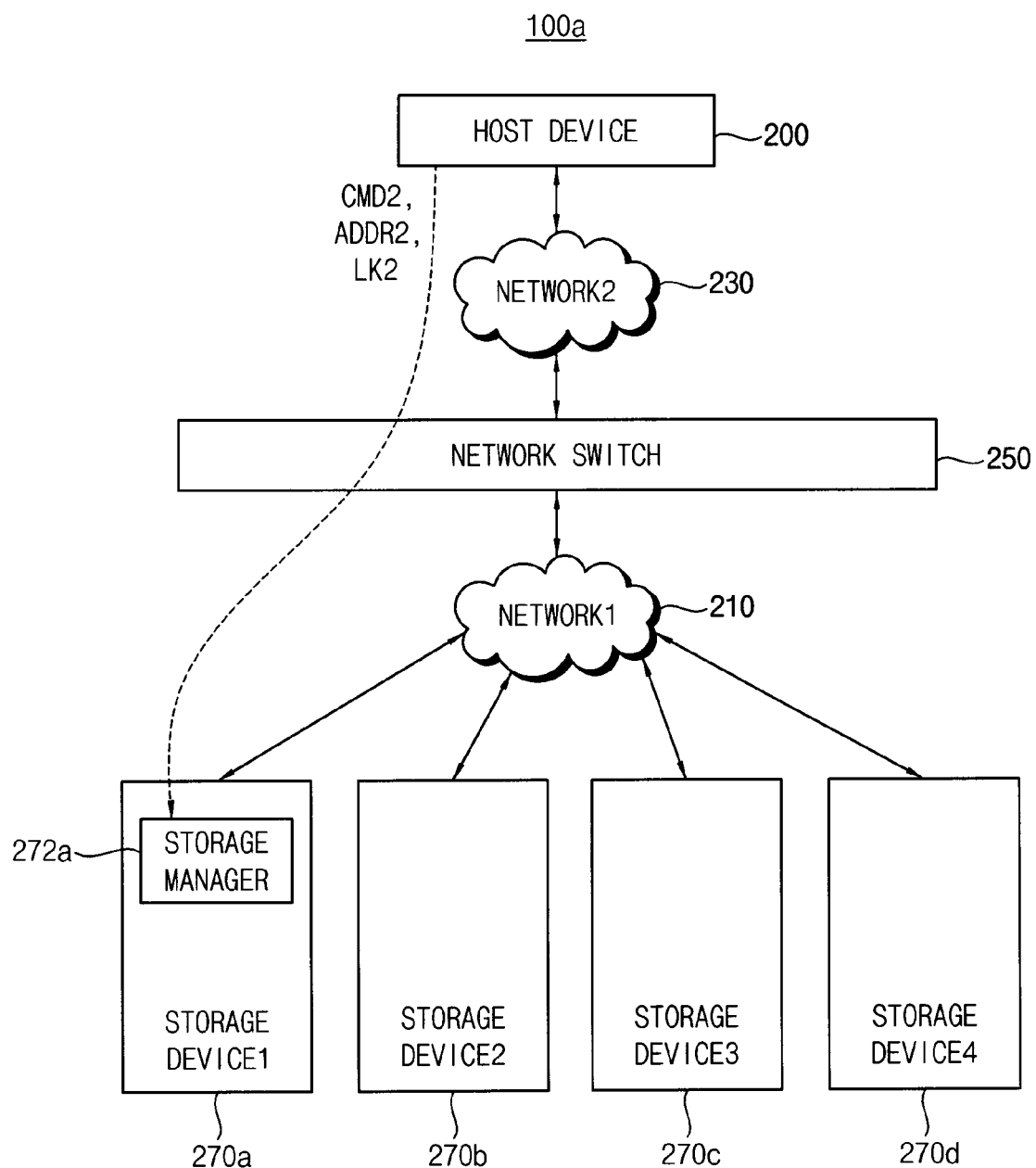
Figure 13B:
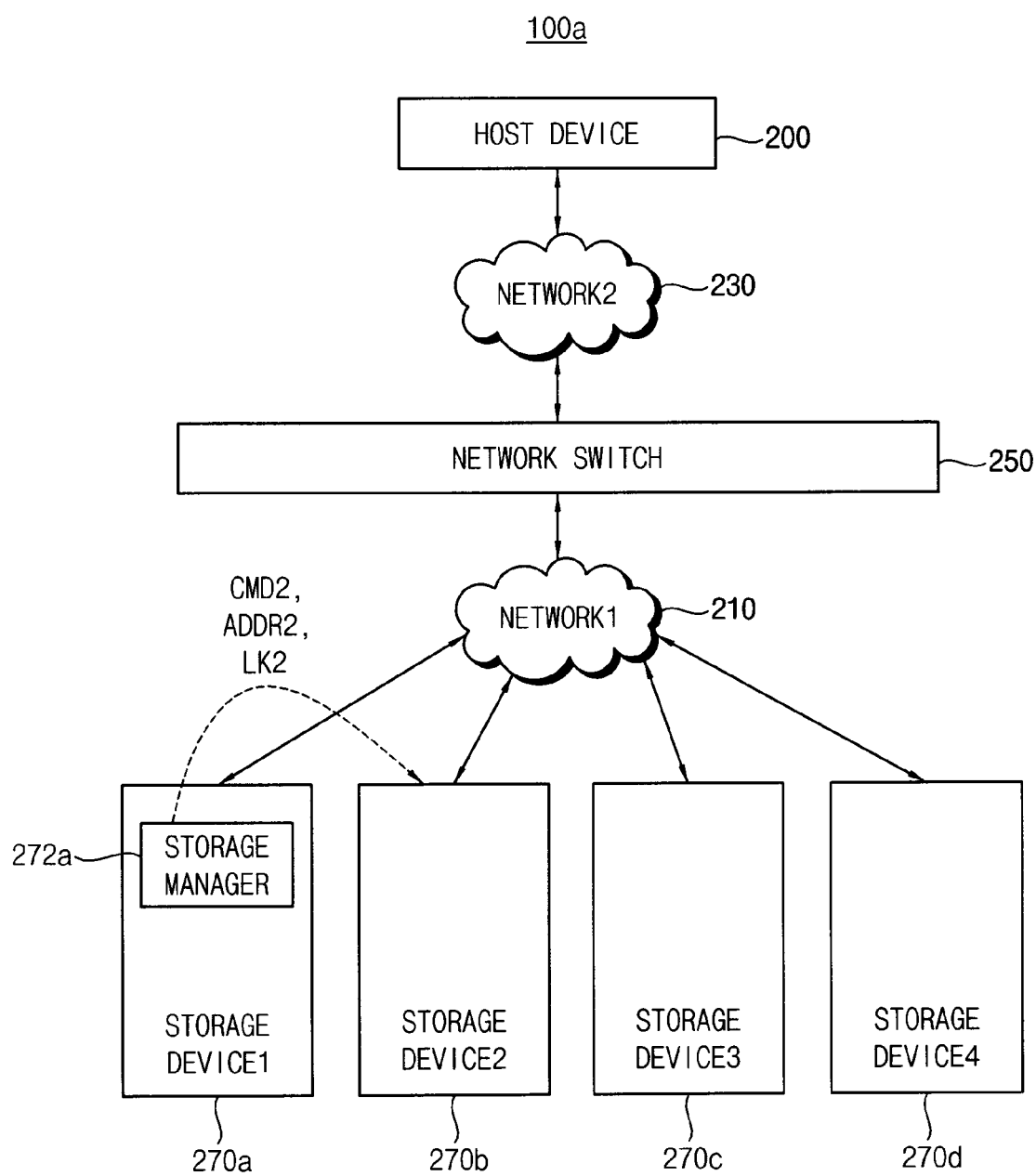

FIG. 12 is a flowchart illustrating another example of receiving a command, an address and a local key and an example of accessing a target storage device in FIG. 9. FIGS. 13A, 13B and 13C are diagrams for describing an operation of FIG. 12. The descriptions repeated with FIGS. 10, 11A and 11B will be omitted.

Referring to FIGS. 9, 12, 13A, 13B and 13C, when receiving the command, the address and the local key for accessing the target storage device (step S500), the first storage device 270a may receive a second command CMD2, a second address ADDR2, and the second local key LK2 for accessing the second storage device 270b from the host device 200 (step S520). In other words, FIGS. 12, 13A, 13B and 13C illustrate an example where the second storage device 270b is the target storage device.

The first storage device 270a may transmit the second command CMD2, the second address ADDR2 and the second local key LK2 to the second storage device 270b (step S530). As with step S300 in FIGS. 1 and 9, an operation in which the second storage device 270b receives the second command CMD2, the second address ADDR2 and the second local key LK2 from the first storage device 270a may also be performed based on the P2P scheme.

When accessing the target storage device (step S600), the second storage device 270b and the host device 200 may directly exchange data without passing through the first storage device 270a based on the second command CMD2, the second address ADDR2 and the second local key LK2 (step S620). For example, second write data WDAT2 to be stored in the second storage device 270b may be directly provided from the host device 200 to the second storage device 270b or second read data RDAT2 stored in the second storage device 270b may be obtained and directly provided from the second storage device 270b to the host device 200, depending on whether the second command CMD2 is a write command or a read command.

In the example of FIGS. 12, 13A, 13B and 13C, the second command CMD2, the second address ADDR2, and the second local key LK2 other than the data WDAT2 or RDAT2 may be transmitted to the second storage device 270b based on the P2P scheme after being received by the first storage device 270a, which is the main storage device, and the data WDAT2 or RDAT2 may be directly exchanged between the second storage device 270b and the host device 200 without passing through the first storage device 270a.

Figure 14:
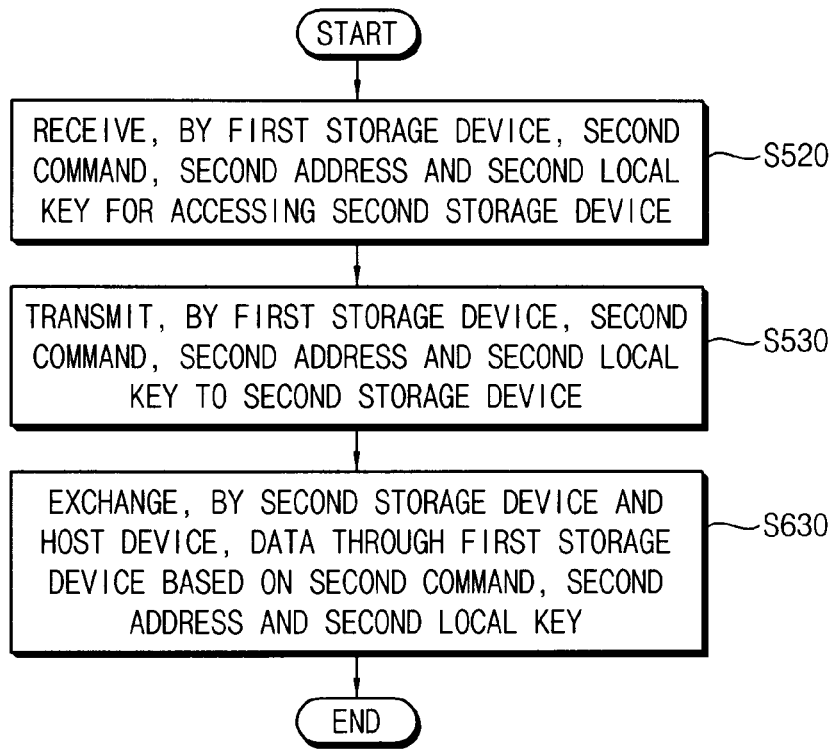
FIG. 14 is a flowchart illustrating still another example of receiving a command, an address and a local key and an example of accessing a target storage device in FIG. 9.
Figure 15:
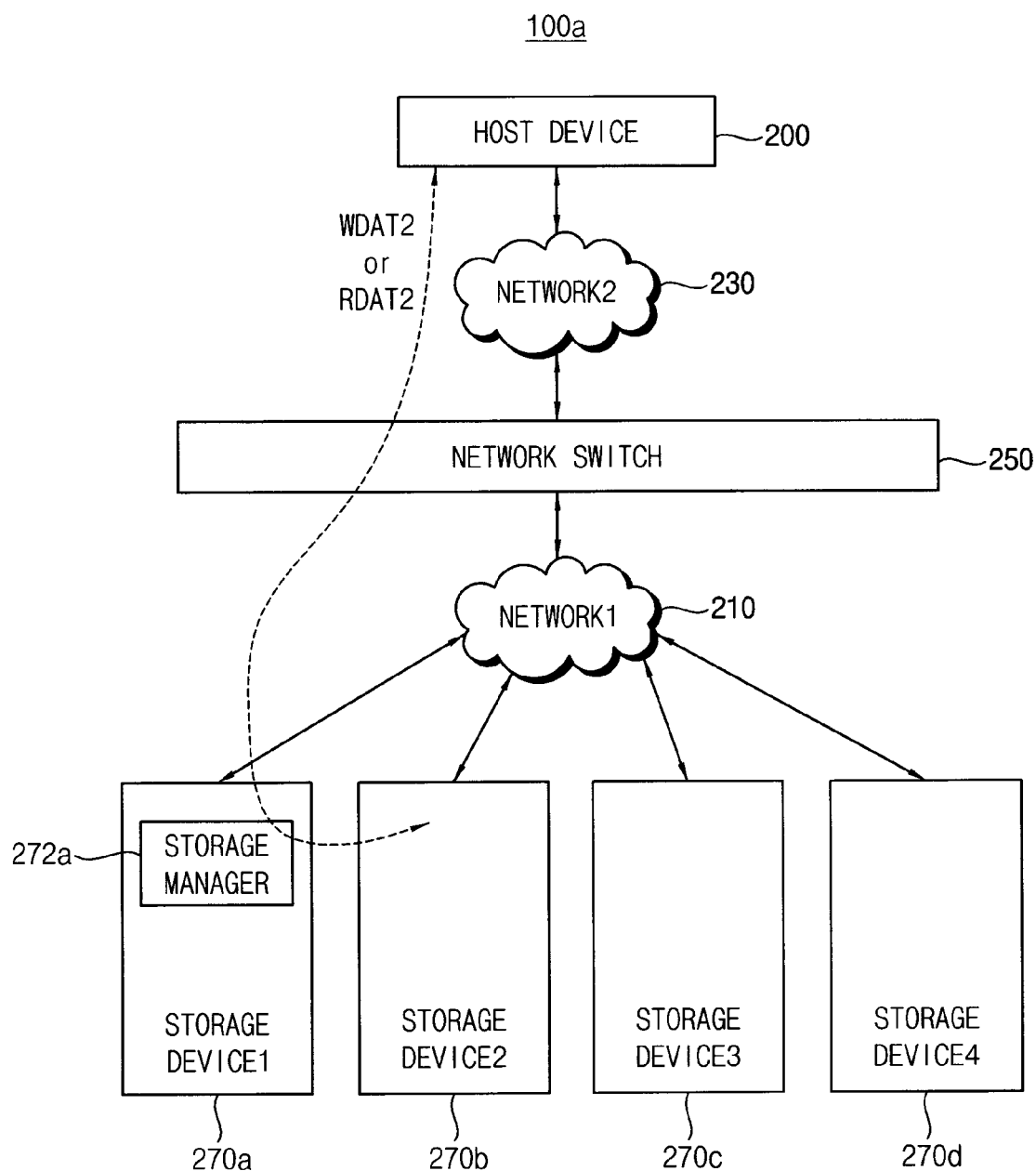
FIG. 15 is a diagram for describing an operation of FIG. 14.

FIG. 14 is a flowchart illustrating still another example of receiving a command, an address and a local key and an example of accessing a target storage device in FIG. 9. FIG. 15 is a diagram for describing an operation of FIG. 14. The descriptions repeated with FIGS. 10, 11A, 11B, 12, 13A, 13B and 13C will be omitted.

Referring to FIGS. 9, 14 and 15, when receiving the command, the address and the local key for accessing the target storage device (step S500), steps S520 and S530 in FIG. 14 may be substantially the same as steps S520 and S530 in FIG. 12, respectively.

When accessing the target storage device (step S600), the second storage device 270b and the host device 200 may exchange data through the first storage device 270a based on the second command CMD2, the second address ADDR2, and the second local key LK2 (step S630). For example, the second write data WDAT2 to be stored in the second storage device 270b may be provided from the host device 200 to the second storage device 270b through the first storage device 270a or the second read data RDAT2 stored in the second storage device 270b may be obtained and provided from the second storage device 270b to the host device 200 through the first storage device 270a, depending on whether the second command CMD2 is a write command or a read command.

In the example of FIGS. 14 and 15, the data WDAT2 or RDAT2 as well as the second command CMD2, the second address ADDR2 and the second local key LK2 may also be transmitted and/or exchanged through the first storage device 270a.

Although FIGS. 10 through 15 illustrate that only one of the plurality of storage devices 270a to 270d is accessed, example embodiments are not limited thereto, and two or more of the plurality of storage devices 270a to 270d may be substantially simultaneously or concurrently accessed.

Figure 16:
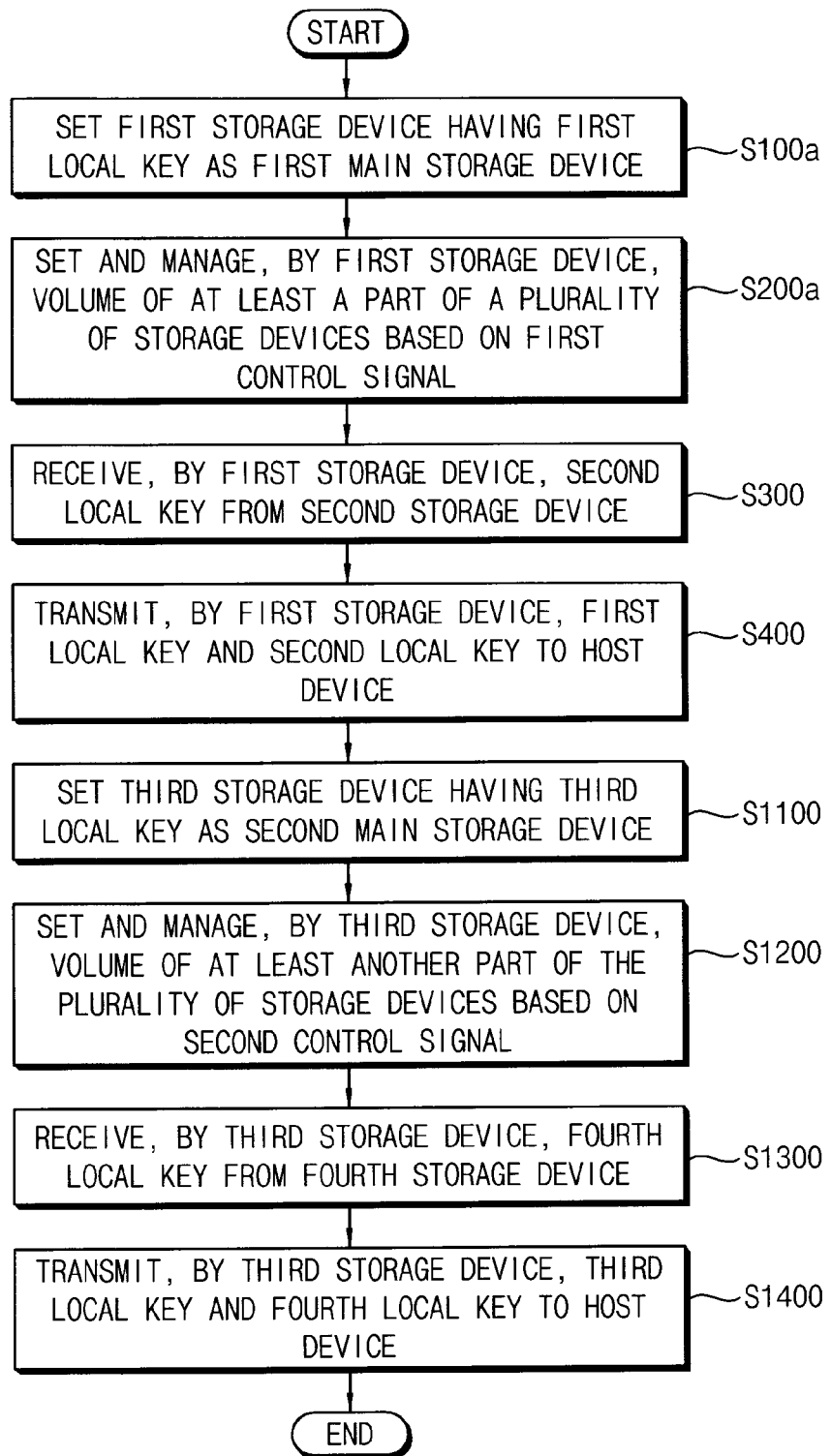
FIG. 16 is a flowchart illustrating a method of operating network-based storage devices according to example embodiments.

FIG. 16 is a flowchart illustrating a method of operating network-based storage devices according to example embodiments. The descriptions repeated with FIG. 1 will be omitted.

Referring to FIG. 16, in a method of operating network-based storage devices according to example embodiments, the first storage device 270a is set as a first main storage device (step S100a), and the first storage device 270a sets and manages the volume of at least a part of the plurality of storage devices based on the first control signal (step S200a). Steps S100a and S200a in FIG. 16 may be similar to steps S100 and S200 in FIG. 1, respectively. Steps S300 and S400 in FIG. 16 may be substantially the same as steps S300 and S400 in FIG. 1, respectively.

In addition, a third storage device 270c having a third local key among the plurality of storage devices is set as a second main storage device (step S1100). The third storage device 270c sets and manages a volume of at least another part of the plurality of storage devices based on a second control signal received from the external host device 200 (step S1200). The third storage device 270c receives a fourth local key from a fourth storage device having the fourth local key among the plurality of storage devices (step S1300). The third storage device 270c transmits the third local key and the fourth local key to the external host device 200 (step S1400). Steps S1100, S1200, S1300 and S1400 in FIG. 16 may be similar to steps S100a, S200a, S300 and S400 in FIG. 16, respectively.

In the example of FIG. 16, the first storage device 270a may manage all functions for some of the plurality of storage devices 270a to 270d, and the third storage device 270c may manage all functions for the other of the plurality of storage devices 270a to 270d.

Although FIG. 16 illustrates that steps S1100, S1200, S1300 and S1400 are performed after steps S100a, S200a, S300 and S400 are performed, example embodiments are not limited thereto. For example, steps S100a and S1100 may be substantially simultaneously performed, steps S200a and S1200 may be substantially simultaneously performed, steps S300 and S1300 may be substantially simultaneously performed, and steps S400 and S1400 may be substantially simultaneously performed.

Figure 17:
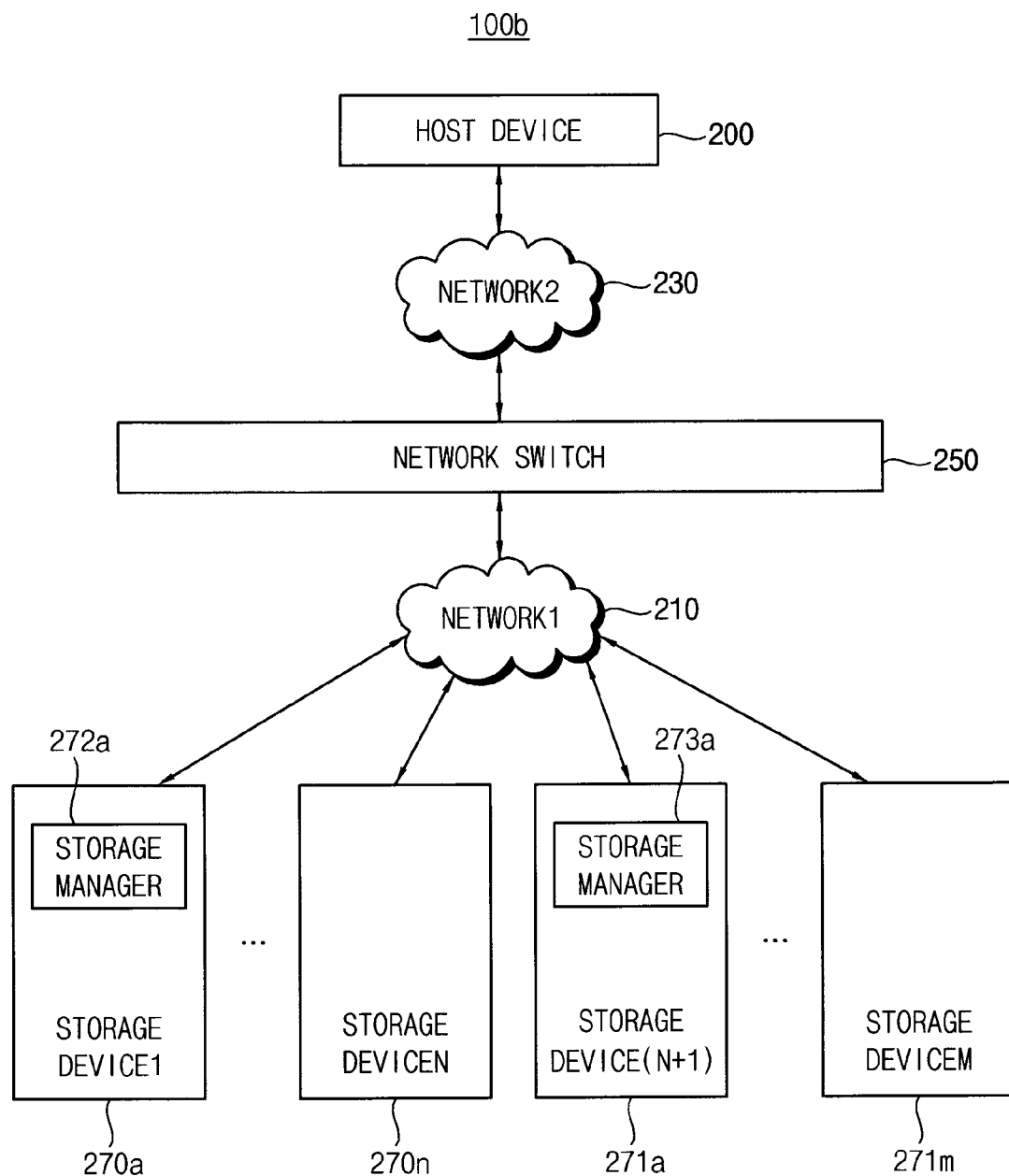
FIG. 17 is a block diagram illustrating a storage device and a storage system including the storage device according to example embodiments.

FIG. 17 is a block diagram illustrating a storage device and a storage system including the storage device according to example embodiments. The descriptions repeated with FIG. 2 will be omitted.

Referring to FIG. 17, a storage system 100b of FIG. 17 may be substantially the same as the storage system 100 of FIG. 2, except that a configuration of a plurality of storage devices 270a, . . . , 270n and 271a, . . . , 271m is changed.

The storage device 270a among the plurality of storage devices 270a to 270n and 271a to 271m may be set as a first main storage device, the storage device 270a may perform a volume setting and managing operation, a local key receiving operation, and a local key transmitting operation on the storage devices 270a to 270n of a first group, and the storage device 270a may include a storage manager 272a for performing the above-described operations. In addition, the storage device 271a among the plurality of storage devices 270a to 270n and 271a to 271m may be set as a second main storage device, the storage device 271a may perform a volume setting and managing operation, a local key receiving operation, and a local key transmitting operation on the storage devices 271a to 271m of a second group, and the storage device 271a may include a storage manager 273a for performing the above-described operations.

According to example embodiments, the number of the storage devices 270a to 270n may be substantially equal to or different from the number of the storage devices 271a to 271m.

Figure 18:
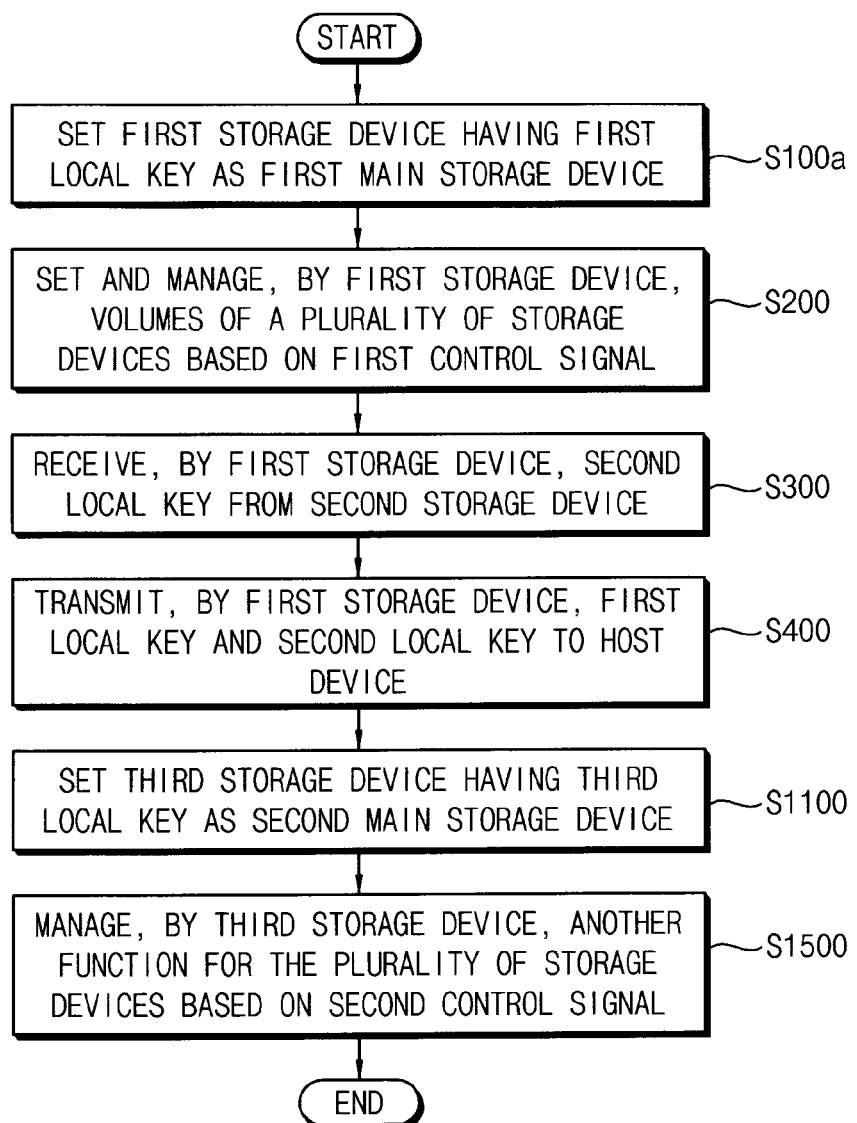
FIG. 18 is a flowchart illustrating a method of operating network-based storage devices according to example embodiments.

FIG. 18 is a flowchart illustrating a method of operating network-based storage devices according to example embodiments. The descriptions repeated with FIGS. 1 and 16 will be omitted.

Referring to FIG. 18, in a method of operating network-based storage devices according to example embodiments, steps S100a and S1100 in FIG. 18 may be substantially the same as steps S100a and S1100 in FIG. 16, respectively. Steps S200, S300 and S400 in FIG. 18 may be substantially the same as steps S200, S300 and S400 in FIG. 1, respectively.

The third storage device 270c manages another function (or the other functions) for the plurality of storage devices 270a to 270d based on a second control signal received from the external host device 200 (step S1500). For example, the other function may include functions other than a volume setting and configuration among various functions.

In the example of FIG. 18, the first storage device 270a may manage some function or a first function (e.g., the volume setting and configuration) for all of the plurality of storage devices 270a to 270d and the third storage device 270c may manage another function or a second function for all of the plurality of storage devices 270a to 270d.

When the number of the plurality of storage devices 270a to 270d is relatively large, it may be inefficient for one main storage device to manage all storage devices. In this example, as described with reference to FIGS. 16 and 18, two storage devices may be set to two main storage devices, each of two main storage devices may manage only some of the storage devices or only some functions for the plurality of storage devices 270a to 270d, and thus the network-based storage devices may be more efficiently managed.

Although FIGS. 16 and 18 illustrate that only two storage devices are set to the main storage devices, example embodiments are not limited thereto and the number of main storage devices may be variously changed according to example embodiments.

Figure 19:
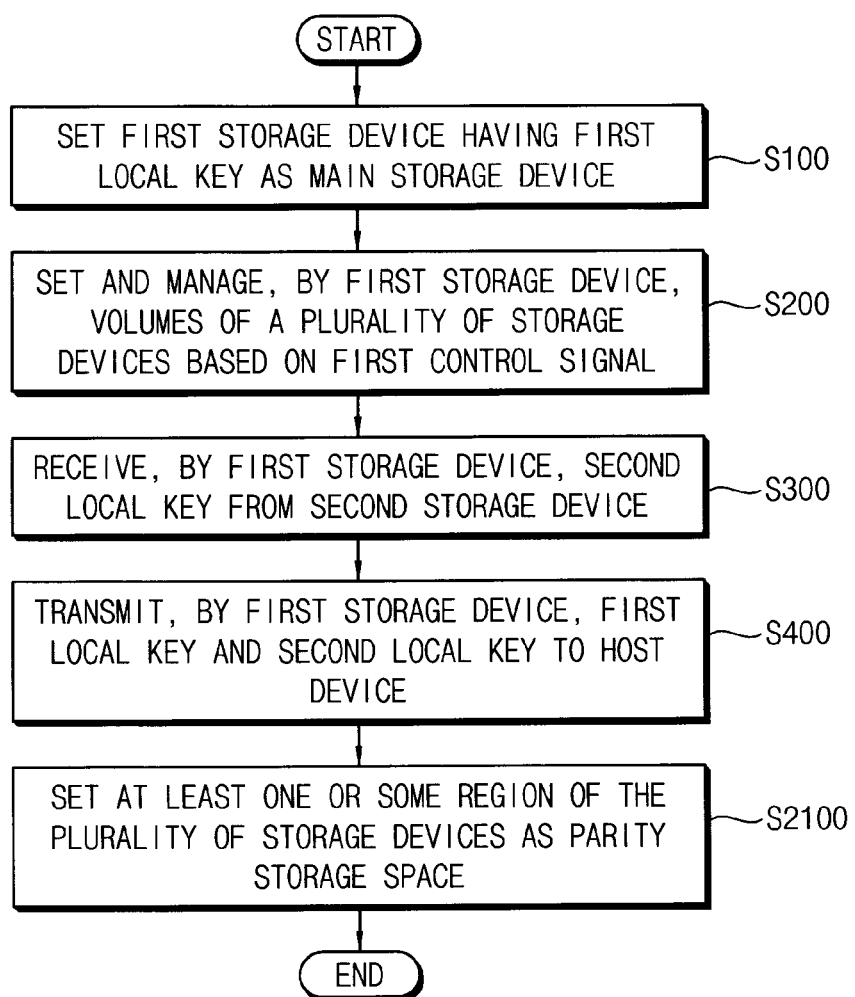
FIG. 19 is a flowchart illustrating a method of operating network-based storage devices according to example embodiments.
Figure 20A:
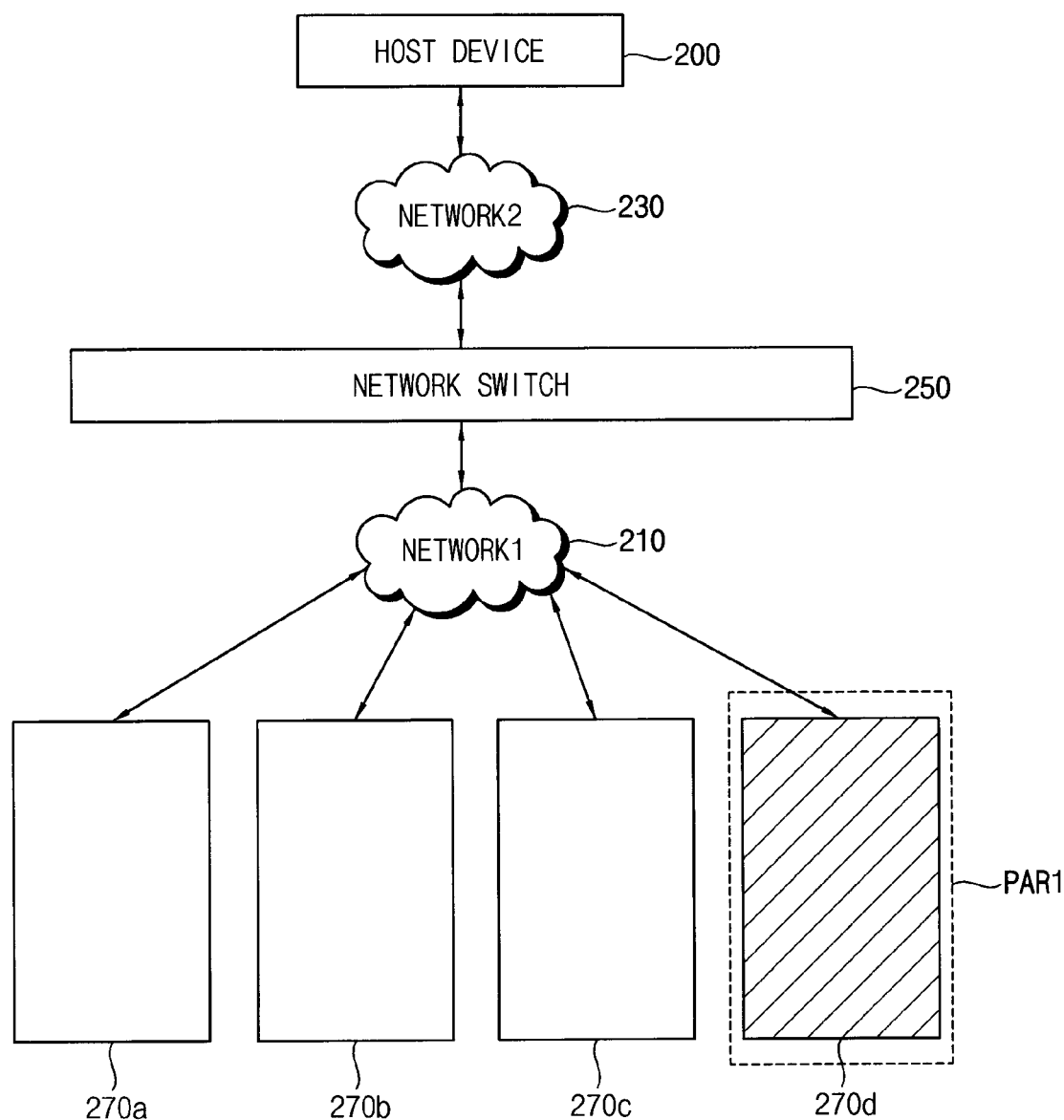
FIGS. 20A and 20B are diagrams for describing a method of operating network-based storage devices of FIG. 19.
Figure 20B:
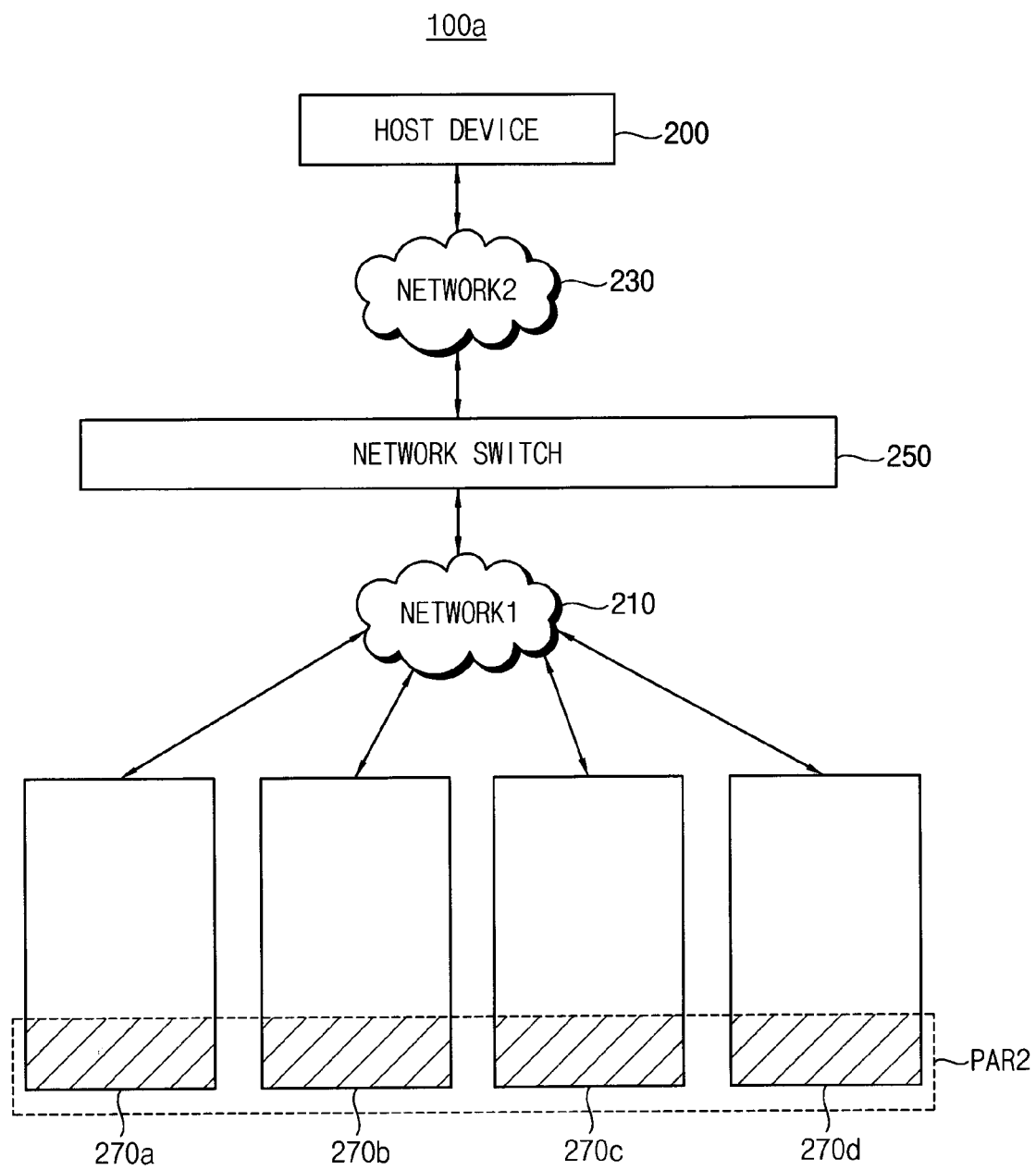

FIG. 19 is a flowchart illustrating a method of operating network-based storage devices according to example embodiments. FIGS. 20A and 20B are diagrams for describing a method of operating network-based storage devices of FIG. 19. The descriptions repeated with FIG. 1 will be omitted.

Referring to FIGS. 19, 20A and 20B, in a method of operating network-based storage devices according to example embodiments, steps S100, S200, S300 and S400 in FIG. 19 may be substantially the same as steps S100, S200, S300 and S400 in FIG. 1, respectively.

At least one and/or some region of the plurality of storage devices 270a to 270d may be set as a parity storage space (or parity disk) (step S2100). For example, the parity storage space may store parity bits that are generated by an erasure coding, RAID (e.g., RAID-5, RAID-6), or the like, performed for the error recovery. For example, step S2100 may be performed by the first storage device 270a.

In some example embodiments, as illustrated in FIG. 20A, the entire region of some storage device (e.g., the storage device 270d) may be set as a parity storage space PAR1. In other example embodiments, as illustrated in FIG. 20B, partial regions of all of the plurality of the storage devices 270a to 270d may be set as a parity storage space PAR2 in order to distribute or spread the parity bits. However, example embodiments are not limited thereto, and the entire region of two or more storage devices or a partial region of some storage device may be set as the parity storage space.

Figure 21:
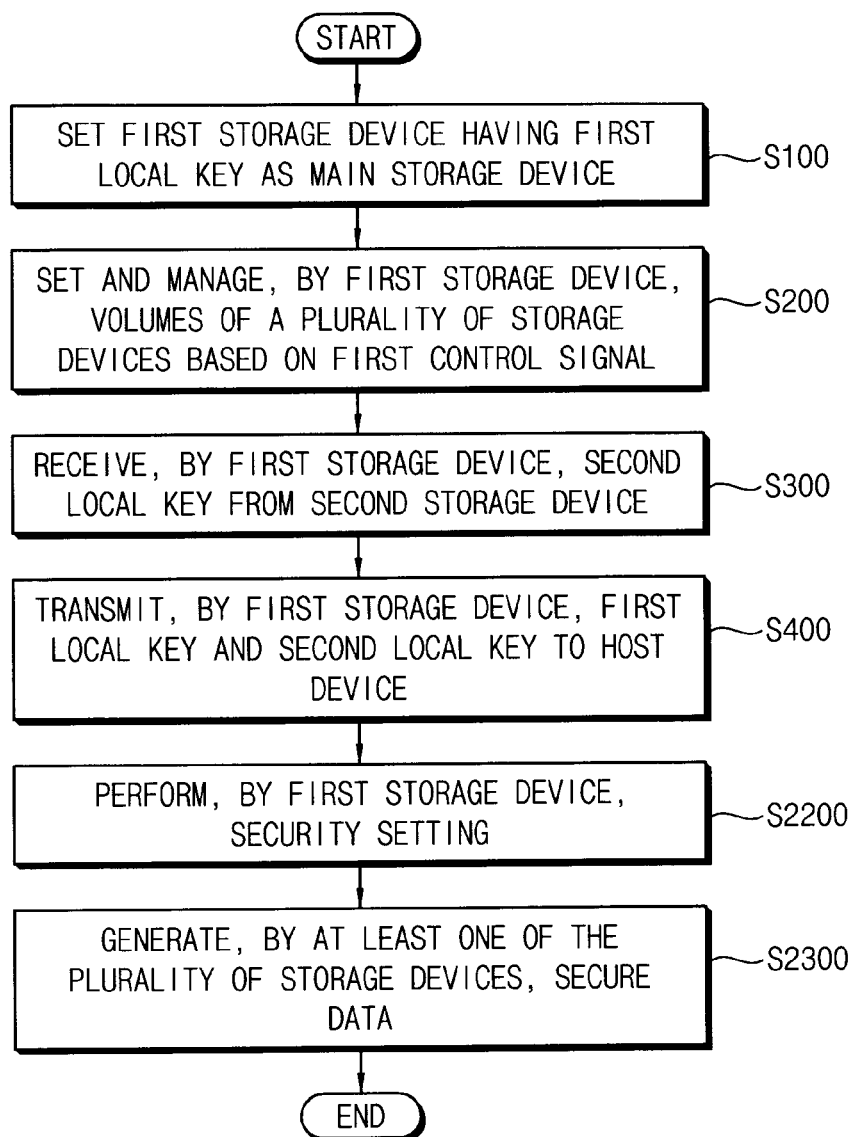
FIG. 21 is a flowchart illustrating a method of operating network-based storage devices according to example embodiments.
Figure 22A:
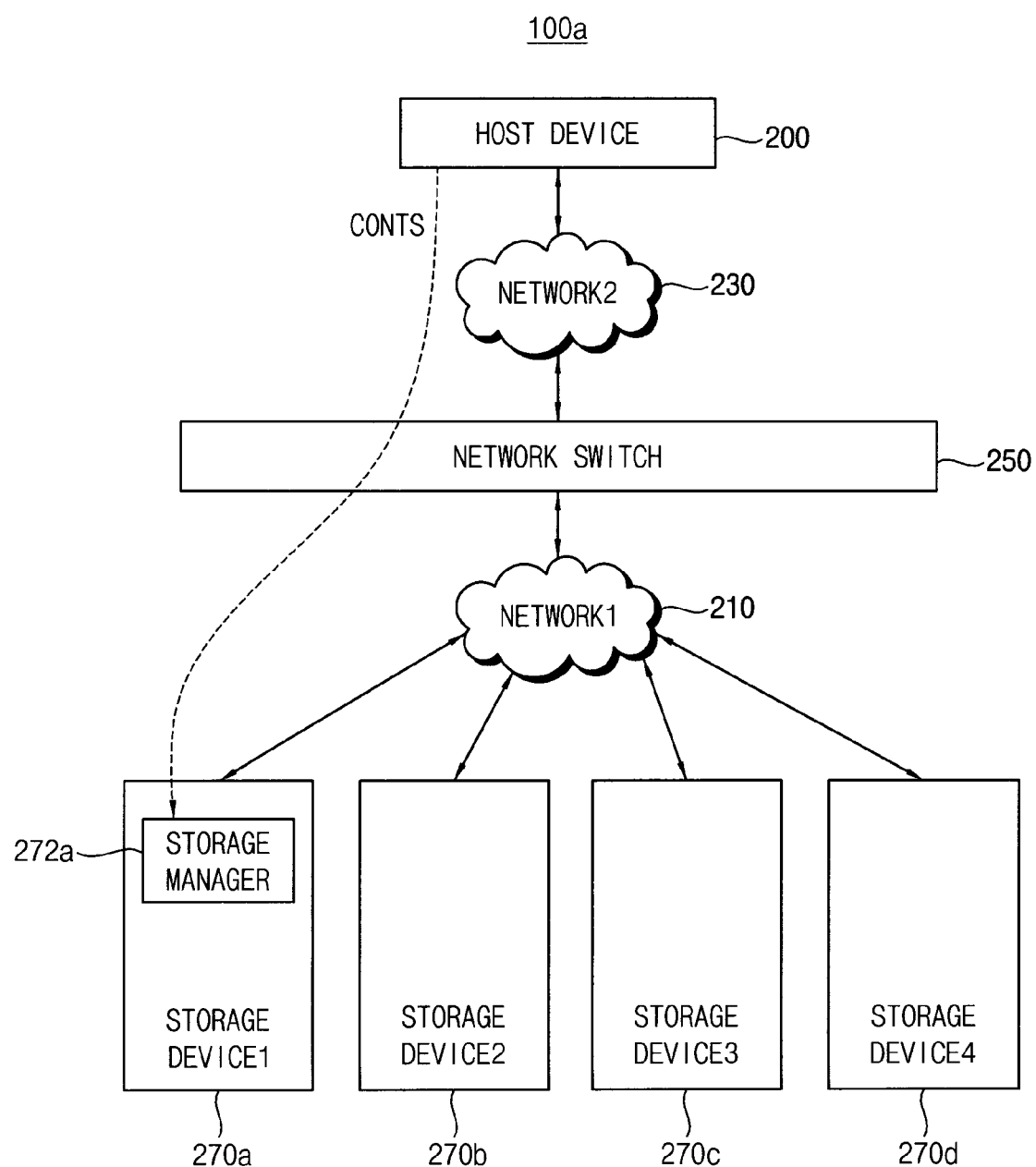

FIG. 21 is a flowchart illustrating a method of operating network-based storage devices according to example embodiments. FIGS. 22A, 22B and 22C are diagrams for describing a method of operating network-based storage devices of FIG. 21. The descriptions repeated with FIG. 1 will be omitted.

Referring to FIGS. 21, 22A, 22B and 22C, in a method of operating network-based storage devices according to example embodiments, steps S100, S200, S300 and S400 in FIG. 21 may be substantially the same as steps S100, S200, S300 and S400 in FIG. 1, respectively.

The first storage device 270a may perform a security setting for the plurality of storage devices 270a to 270d (step S2200). For example, an authentication process may be performed using NVMe in-band authentication and/or a connection/key exchange, which is an initial step, may be performed using Internet protocol security (IPSec).

For example, as illustrated in FIG. 22A, the host device 200 may transmit a control signal CONTS for the security setting to the first storage device 270a. After that, as illustrated in FIG. 22B, the host device 200 and the first storage device 270a may exchange, set, and form a secure key SK1 that is different from the local keys LK1 to LK4 and is a key for the security settings. After that, as illustrated in FIG. 22C, the first storage device 270a may transmit the secure key SK1 to the remaining storage devices 270b to 270d. Thus, all of the plurality of storage devices 270a to 270d may use the same secure key SK1.

After the security setting is performed, at least one of the plurality of storage devices 270a to 270d may configure and generate secure data (step S2300). For example, encrypted data may be generated using the secure key SK1, and the encrypted data may be data in which an IPSec header is generated. After that, an operation in which the at least one of the plurality of storage devices 270a to 270d and the host device 200 exchange the secure data may be substantially the same as described with reference to FIGS. 9 through 15.

Figure 23:
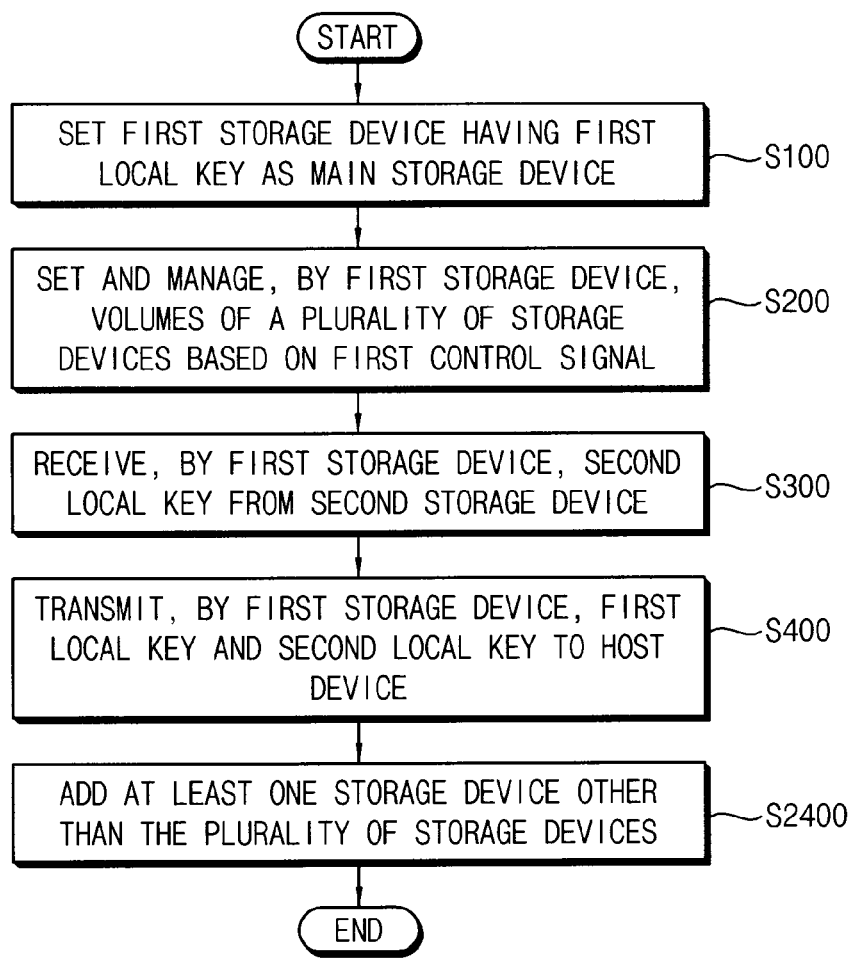
FIG. 23 is a flowchart illustrating a method of operating network-based storage devices according to example embodiments.
Figure 24:
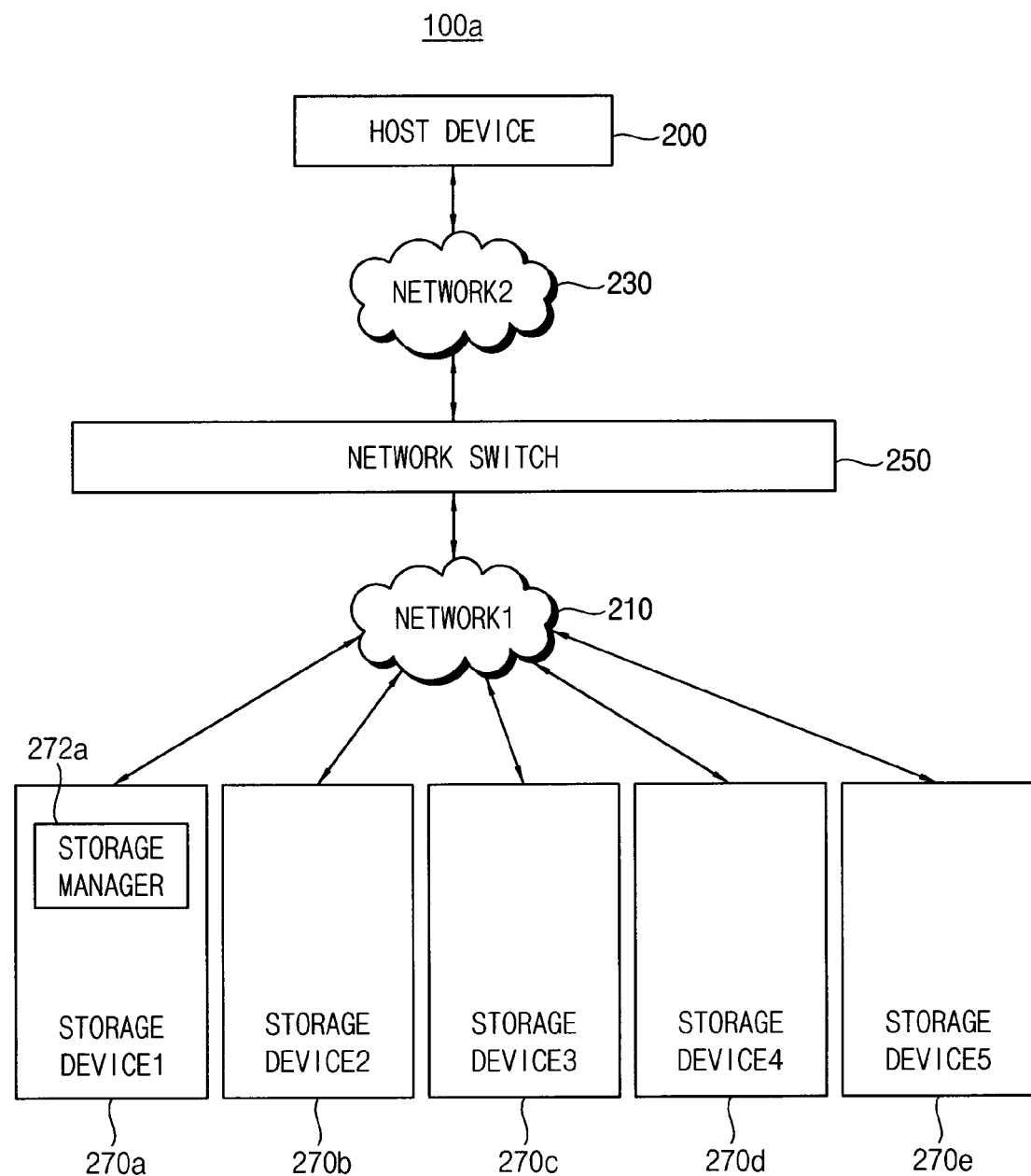
FIG. 24 is a diagram for describing a method of operating network-based storage devices of FIG. 23.

FIG. 23 is a flowchart illustrating a method of operating network-based storage devices according to example embodiments. FIG. 24 is a diagram for describing a method of operating network-based storage devices of FIG. 23. The descriptions repeated with FIG. 1 will be omitted.

Referring to FIGS. 23 and 24, in a method of operating network-based storage devices according to example embodiments, steps S100, S200, S300 and S400 in FIG. 23 may be substantially the same as steps S100, S200, S300 and S400 in FIG. 1, respectively.

At least one storage device other than the plurality of storage devices 270a to 270d may be added (step S2400). For example, as illustrated in FIG. 24, the plurality of storage devices 270a to 270d may be additionally connected to a storage devices 270e other than the plurality of storage devices 270a to 270d through the first network 210, and thus the total volume or capacity of the storage system 100a may be increased.

In some example embodiments, the main storage devices may be configured based on a media access control (MAC) address, an Internet Protocol (IP) address or another object having a similar function, and at least one storage device may be added based on the object of the main storage device, thereby increasing the total volume. In other example embodiments, a virtual volume may be configured using a thin provisioning, or the like, and the total volume may be increased based on the object if the actual volume is insufficient. In still other example embodiments, a storage pool of the plurality of storage devices may be managed.

Although the methods of operating the network-based storage devices according to example embodiments are described with reference to FIGS. 1 through 24, example embodiments may be described as a method of operating the storage system including the host device and the plurality of storage devices.

As will be appreciated by those skilled in the art, the disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

FIG. 25 is a block diagram illustrating a storage server including a storage device according to example embodiments.

Referring to FIG. 25, a storage server 1000 may include a host device 1100, a server 1200 and a plurality of storage modules 1300.

The server 1200 may include a server controller 1210 and a redundant array of independent drives (RAID) controller 1220 that controls the plurality of storage modules 1300.

The RAID techniques are mainly used in data servers where important data can be replicated in more than one location across a plurality of storage devices. The RAID controller 1220 may enable one of a plurality of RAID levels according to RAID information and may interface data between the server 1200 and the plurality of storage modules 1300.

Each of the plurality of storage modules 1300 may include a network switch 1310 and a plurality of storage devices 1320 that store data required to drive the server 1200. The host device 1100, the network switch 1310 and the plurality of storage devices 1320 may correspond to the host device 200, the network switch 250 and the plurality of storage devices 270a to 270n included in the storage system 100 according to example embodiments, respectively, and may operate according to example embodiments described with reference to FIGS. 1 through 24. A main storage device among the plurality of storage devices 1320 may include a storage manager SM, and thus the volumes of the plurality of storage modules 1300 may be efficiently configured and managed without an additional external controller.

The disclosure may be applied to various devices and/or systems including the storage devices and the storage systems. For example, the disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage device comprising:
a nonvolatile memory;
a volatile memory; and
a controller coupled to the nonvolatile memory and the volatile memory, and including a storage manager configured to receive a first control signal from an external host device and to manage a volume of the storage device and an external storage device based on the first control signal,
wherein the storage manager is configured to provide a first local key to the external host device,
the storage manager is configured to receive a second local key from the external storage device and to provide the second local key to the external host device, and
the first local key is used when the external host device accesses the storage device, and the second local key is used when the external host device accesses the external storage device.

2. The storage device of claim 1, wherein the storage manager receives the second local key from the external storage device based on a peer-to-peer (P2P) scheme.

3. The storage device of claim 1, wherein the storage manager divides the storage device and the external storage device into a first partition having a first volume and a second partition having a second volume.

4. The storage device of claim 1, wherein read data obtained from the external storage device based on the second local key is provided to the external host device through the storage device, and
write data stored in the external storage device based on the second local key is provided from the external host device to the external storage device through the storage device.

5. The storage device of claim 1, wherein at least one of the storage device and the external storage device is set as a parity storage configured to store parity bits.

6. The storage device of claim 5, wherein the parity bits are generated by an erasure coding, and used for an error recovery.

7. A storage device comprising:
a nonvolatile memory;
a volatile memory; and
a controller coupled to the nonvolatile memory and the volatile memory, configured to receive a first control signal from an external host device, and configured to set a volume of the storage device and an external storage device based on the first control signal,
wherein the controller is configured to provide a first local key to the external host device,
the controller is configured to receive a second local key from the external storage device and to provide the second local key to the external host device,
the first local key is used when the external host device accesses the storage device, and the second local key is used when the external host device accesses the external storage device, and
the controller is configured to receive a command and the second local key from the external host device, and to cause the external host device and the external storage device to exchange data.

8. The storage device of claim 7, wherein the controller receives write data and the second local key from the external host device, and provides the write data to the external storage device.

9. The storage device of claim 7, wherein the controller receives the second local key from the external host device, receives read data from the external storage device, and provides the read data to the external host device.

10. The storage device of claim 7, wherein the controller causes the external host device and the external storage device to exchange data directly without passing through the storage device.

11. The storage device of claim 7, wherein the controller receives the second local key from the external storage device based on a peer-to-peer (P2P) scheme.

12. The storage device of claim 7, wherein the storage device and the external storage device are divided into a first partition having a first volume and a second partition having a second volume.

13. The storage device of claim 7, wherein at least one of the storage device and the external storage device is set as a parity storage configured to store parity bits.

14. The storage device of claim 13, wherein the parity bits are generated by an erasure coding, and used for an error recovery.

15. A storage device comprising:
a nonvolatile memory;
a volatile memory; and
a controller coupled to the nonvolatile memory and the volatile memory, configured to receive a first control signal from an external host device, and configured to manage a volume of the storage device and an external storage device based on the first control signal,
  wherein the controller is configured to provide a first local key to the external host device,
the controller is configured to receive a second local key from the external storage device and to provide the second local key to the external host device,
the first local key is used when the external host device accesses the storage device, and the second local key is used when the external host device accesses the external storage device, and
when the controller receives a write command, write data and the second local key from the external host device, the controller provides the write data to the external storage device, and
when the controller receives a read command and the second local key from the external host device, the controller receives read data from the external storage device and provides the read data to the external host device.

16. The storage device of claim 15, wherein the storage device performs a security setting for the external storage device.

17. The storage device of claim 15, wherein at least one of the storage device and the external storage device is set as a parity storage configured to store parity bits.

18. The storage device of claim 17, wherein the parity bits are generated by an erasure coding, and used for an error recovery.

19. The storage device of claim 15, wherein the storage device and the external storage device are divided into a first partition having a first volume and a second partition having a second volume, and
  a size of the first volume is different from a size of the second volume.

20. The storage device of claim 15, wherein the controller receives the second local key from the external storage device based on a peer-to-peer (P2P) scheme.

* * * * *